(12) United States Patent
Chen et al.

(10) Patent No.: US 9,521,418 B2
(45) Date of Patent: Dec. 13, 2016

(54) SLICE HEADER THREE-DIMENSIONAL VIDEO EXTENSION FOR SLICE HEADER PREDICTION

(75) Inventors: Ying Chen, San Diego, CA (US); Ye-Kui Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 13/553,628

(22) Filed: Jul. 19, 2012

(65) Prior Publication Data

US 2013/0057646 A1 Mar. 7, 2013

Related U.S. Application Data

(60) Provisional application No. 61/510,738, filed on Jul. 22, 2011, provisional application No. 61/522,584, (Continued)

(51) Int. Cl.
*H04N 19/70* (2014.01)
*H04N 19/46* (2014.01)
(Continued)

(52) U.S. Cl.
CPC .......... *H04N 19/172* (2014.11); *H04N 19/174* (2014.11); *H04N 19/44* (2014.11);
(Continued)

(58) Field of Classification Search
CPC ............ H04N 7/26265; H04N 7/26335; H04N 19/00769; H04N 19/00533; H04N 19/00545; H04N 19/00272; H04N 19/00266; H04N 19/00781; H04N 19/00884; H04N 19/597; H04N 19/70; H04N 19/172; H04N 19/44; H04N 19/61; H04N 19/174; H04N 19/46
See application file for complete search history.

(56) References Cited

U.S. PATENT DOCUMENTS 5,107,705 A 4/1992 Wraight et al.
5,329,369 A 7/1994 Willis et al.
(Continued)

FOREIGN PATENT DOCUMENTS

CN 1301370 A 6/2001
CN 101176348 A 5/2008
(Continued)

OTHER PUBLICATIONS

Second Written Opinion of international application No. PCT/US2012/047705, dated Jul. 23, 2013, 7 pp.
(Continued)

*Primary Examiner* — Mohammed Jebari
(74) *Attorney, Agent, or Firm* — Shumaker & Sieffert, P.A.

(57) ABSTRACT

In one example, a video coder is configured to code one or more blocks of video data representative of texture information of at least a portion of a frame of video data, process a texture slice for a texture view component of a current view associated, the texture slice comprising the coded one or more blocks and a texture slice header comprising a set of syntax elements representative of characteristics of the texture slice, code depth information representative of depth values for at least the portion of the frame, and process a depth slice for a depth view component corresponding to the texture view component of the view, the depth slice comprising the coded depth information and a depth slice header comprising a set of syntax elements representative of char-
(Continued)

acteristics of the depth slice, wherein process the texture slice or the depth slice comprises predict at least one syntax element.

44 Claims, 6 Drawing Sheets

Related U.S. Application Data filed on Aug. 11, 2011, provisional application No. 61/563,772, filed on Nov. 26, 2011, provisional application No. 61/595,612, filed on Feb. 6, 2012, provisional application No. 61/624,031, filed on Apr. 13, 2012, provisional application No. 61/637,212, filed on Apr. 23, 2012.

(51) Int. Cl.
*H04N 19/172* (2014.01)
*H04N 19/597* (2014.01)
*H04N 19/61* (2014.01)
*H04N 19/174* (2014.01)
*H04N 19/44* (2014.01)

(52) U.S. Cl.
CPC ........... *H04N 19/46* (2014.11); *H04N 19/597* (2014.11); *H04N 19/61* (2014.11); *H04N 19/70* (2014.11)

(56) References Cited

U.S. PATENT DOCUMENTS

| | | | |
|---|---|---|---|
| 5,821,986 A | 10/1998 | Yuan et al. | |
| 5,852,565 A | 12/1998 | Demos | |
| 6,104,434 A | 8/2000 | Nakagawa et al. | |
| 6,125,147 A | 9/2000 | Florencio et al. | |
| 6,310,919 B1 | 10/2001 | Florencio | |
| 6,452,969 B1 | 9/2002 | Yim | |
| 6,665,344 B1 | 12/2003 | Fimoff | |
| 7,006,700 B2 | 2/2006 | Gilgen | |
| 7,163,335 B2 | 1/2007 | Dishaw et al. | |
| 8,160,149 B2 | 4/2012 | Demos | |
| 8,184,028 B2 | 5/2012 | Tsai | |
| 8,239,766 B2 | 8/2012 | Tian et al. | |
| 8,488,677 B2 | 7/2013 | Jeon et al. | |
| 8,750,623 B2 | 6/2014 | Ruan et al. | |
| 8,750,632 B2 * | 6/2014 | Nakamura et al. ........... 382/232 |
| 8,811,482 B2 | 8/2014 | Amon et al. | |
| 9,106,923 B2 | 8/2015 | Lee et al. | |
| 9,143,796 B2 | 9/2015 | Bang et al. | |
| 2002/0120401 A1 | 8/2002 | Macdonald et al. | |
| 2003/0202592 A1 | 10/2003 | Sohn et al. | |
| 2005/0041736 A1 | 2/2005 | Butler-Smith et al. | |
| 2005/0195899 A1 | 9/2005 | Han | |
| 2005/0195900 A1 | 9/2005 | Han | |
| 2006/0012719 A1 | 1/2006 | Karczewicz et al. | |
| 2006/0120614 A1 | 6/2006 | Flierl et al. | |
| 2006/0133492 A1 | 6/2006 | Boyce et al. | |
| 2006/0133503 A1 | 6/2006 | Park et al. | |
| 2006/0193524 A1 | 8/2006 | Tarumoto et al. | |
| 2006/0233258 A1 | 10/2006 | Holcomb | |
| 2006/0268005 A1 | 11/2006 | Hutchins et al. | |
| 2007/0177672 A1* | 8/2007 | Yang ........................ 375/240.25 |
| 2008/0152241 A1 | 6/2008 | Itoi et al. | |
| 2008/0179094 A1 | 7/2008 | Repin et al. | |
| 2008/0219350 A1 | 9/2008 | Guo et al. | |
| 2008/0232470 A1 | 9/2008 | Park et al. | |
| 2009/0002845 A1 | 1/2009 | Hosoya et al. | |
| 2009/0028245 A1 | 1/2009 | Vieron et al. | |
| 2009/0060034 A1 | 3/2009 | Park et al. | |
| 2009/0147848 A1 | 6/2009 | Park et al. | |
| 2009/0152005 A1 | 6/2009 | Chapman et al. | |
| 2009/0175334 A1* | 7/2009 | Ye et al. .................. 375/240.12 |
| 2009/0187391 A1 | 7/2009 | Wendt et al. | |
| 2009/0220000 A1 | 9/2009 | Park et al. | |
| 2009/0262804 A1 | 10/2009 | Pandit et al. | |
| 2009/0262840 A1 | 10/2009 | Jan et al. | |
| 2010/0020871 A1 | 1/2010 | Hannuksela et al. | |
| 2010/0027619 A1 | 2/2010 | Doser et al. | |
| 2010/0046635 A1* | 2/2010 | Pandit ................. H04N 19/597 375/240.25 |
| 2010/0046906 A1 | 2/2010 | Kanamori et al. | |
| 2010/0098157 A1* | 4/2010 | Yang ........................ 375/240.12 |
| 2010/0111183 A1* | 5/2010 | Jeon et al. ................ 375/240.16 |
| 2010/0118933 A1 | 5/2010 | Pandit et al. | |
| 2010/0147510 A1 | 6/2010 | Kwok et al. | |
| 2010/0155142 A1 | 6/2010 | Thambynayagam et al. | |
| 2010/0158129 A1 | 6/2010 | Lai et al. | |
| 2010/0165077 A1 | 7/2010 | Yin et al. | |
| 2010/0166070 A1 | 7/2010 | Goel | |
| 2010/0177819 A1 | 7/2010 | Jeon et al. | |
| 2010/0246683 A1 | 9/2010 | Webb et al. | |
| 2010/0250139 A1 | 9/2010 | Hobbs et al. | |
| 2010/0254458 A1 | 10/2010 | Amon et al. | |
| 2010/0260268 A1 | 10/2010 | Cowan et al. | |
| 2010/0284466 A1 | 11/2010 | Pandit et al. | |
| 2011/0026608 A1 | 2/2011 | Luthra | |
| 2011/0038422 A1 | 2/2011 | Cheon et al. | |
| 2011/0058017 A1 | 3/2011 | Lee et al. | |
| 2011/0090959 A1 | 4/2011 | Wiegand et al. | |
| 2011/0115880 A1 | 5/2011 | Yoo et al. | |
| 2011/0170012 A1 | 7/2011 | Cheon et al. | |
| 2011/0216833 A1 | 9/2011 | Chen et al. | |
| 2011/0221861 A1 | 9/2011 | Jeon et al. | |
| 2011/0222602 A1 | 9/2011 | Sung et al. | |
| 2011/0255796 A1 | 10/2011 | Nakamura et al. | |
| 2011/0261883 A1 | 10/2011 | Bang et al. | |
| 2011/0310982 A1 | 12/2011 | Yang et al. | |
| 2012/0056981 A1 | 3/2012 | Tian et al. | |
| 2012/0075436 A1 | 3/2012 | Chen et al. | |
| 2012/0084652 A1 | 4/2012 | Martinez et al. | |
| 2012/0229602 A1 | 9/2012 | Chen et al. | |
| 2012/0274664 A1 | 11/2012 | Fagnou | |
| 2013/0022127 A1 | 1/2013 | Park et al. | |
| 2013/0038686 A1 | 2/2013 | Chen et al. | |
| 2013/0127987 A1 | 5/2013 | Zhang et al. | |
| 2013/0182760 A1 | 7/2013 | Sasai et al. | |
| 2013/0265409 A1 | 10/2013 | Tjhang et al. | |
| 2013/0287093 A1 | 10/2013 | Hannuksela et al. | |
| 2013/0311147 A1 | 11/2013 | Greenwood | |
| 2013/0315571 A1 | 11/2013 | Park et al. | |
| 2014/0085416 A1 | 3/2014 | Chang et al. | |
| 2014/0218473 A1 | 8/2014 | Hannuksela et al. | |
| 2014/0341292 A1 | 11/2014 | Schwarz et al. | |

FOREIGN PATENT DOCUMENTS

| | | | |
|---|---|---|---|
| CN | 101690220 A | 3/2010 | |
| CN | 101822046 A | 9/2010 | |
| CN | 101911700 A | 12/2010 | |
| CN | WO 2012171477 A1 * | 12/2012 | ......... H04N 13/0048 |
| EP | 1321893 A2 | 6/2003 | |
| EP | 2810443 A1 | 12/2014 | |
| JP | 2010507275 | 3/2010 | |
| JP | 2010507961 A | 3/2010 | |
| JP | 2010524338 A | 7/2010 | |
| JP | 2010525724 A | 7/2010 | |
| JP | 2011509631 A | 3/2011 | |
| JP | 2013030898 A | 2/2013 | |
| JP | 2014517563 A | 7/2014 | |
| KR | 100919885 B1 | 9/2009 | |
| KR | 20100014553 A | 2/2010 | |
| KR | 20100066304 A | 6/2010 | |
| KR | 20100105877 A | 9/2010 | |
| KR | 20110027231 A | 3/2011 | |
| KR | 20110093792 A | 8/2011 | |
| TW | I332794 B | 11/2010 | |
| TW | I332799 B | 11/2010 | |
| TW | I333201 B | 11/2010 | |
| TW | I335183 B | 12/2010 | |
| WO | 2008048499 A2 | 4/2008 | |
| WO | 2008051041 A1 | 5/2008 | |
| WO | 2008123917 A2 | 10/2008 | |

(56) References Cited

FOREIGN PATENT DOCUMENTS

| WO | 2008133455 A1 | 11/2008 |
|---|---|---|
| WO | 2009091383 A2 | 7/2009 |
| WO | 2010043773 A1 | 4/2010 |
| WO | 2010073513 A1 | 7/2010 |
| WO | 2010088420 A1 | 8/2010 |
| WO | 2010096189 A1 | 8/2010 |
| WO | 2010123862 A1 | 10/2010 |
| WO | 2010126227 A2 | 11/2010 |
| WO | 2010126613 A2 | 11/2010 |
| WO | 2011046607 A2 | 4/2011 |
| WO | 2011094034 A2 | 8/2011 |
| WO | 2011100735 A1 | 8/2011 |
| WO | 2011128269 A1 | 10/2011 |
| WO | 2012006299 A1 | 1/2012 |
| WO | 2012039936 | 3/2012 |
| WO | 2012039939 A2 | 3/2012 |
| WO | 2012122364 | 9/2012 |
| WO | 2012171477 A1 | 12/2012 |
| WO | 2013113997 A1 | 8/2013 |

OTHER PUBLICATIONS

Hannuksela, et al., "3D-AVC Draft Text 3," Document JCT3V-A1002, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 68 pp.
International Preliminary Report on Patentability—PCT/US2012/047705, The International Bureau of WIPO—Geneva, Switzerland, Oct. 29, 2013, 6 pp.
Wiegand T et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
"Advanced video coding for generic audiovisual services; H.264 (Mar. 2009)", ITU-T Standard, International Telecommunication Union, Geneva; CH, No. H.264 (Mar. 2009), Mar. 16, 2009 (Mar. 16, 2009), pp. 1-670, XP017436035, [retrieved on Oct. 26, 2009].
"Applications and Requirements on 3D Video Coding," ISO/IEC JTC1/SC29/WG11, MPEG2011/N12035, Geneva, Switzerland, Mar. 2011, XP030018528, 7 pp.
Hannuksela, "Test Model under Consideration for AVC based 3D video coding", 98. MPEG Meeting; Nov. 28, 2011-Dec. 2, 2012; Geneva; (Motion Picture Expert Group or ISO/IEC JTC1/SC29/WG11), No. N12349, Dec. 3, 2011 (Dec. 3, 2011), pp. 1-15, XP030018844.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) OF ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCTVC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross et al., "WD5: Working Draft 5 of High-Efficiency Video Coding," JCTVC-G1103_d2, (JCT-VC) OF ITU-T SG16 WP3 and ISO/IEC JTC1/SC29/WG11 Joint Collaborative Team on Video Coding, 7th Meeting, Geneva, Switzerland (Nov. 2011), 214 pp.
"Call for Proposals on 3D Video Coding Technology," ISO/IEC JTC1/SC29/WG11, MPEG2011/N12036, Geneva, Switzerland, 20 pp., Mar. 2011.

"Changes to VSRS Software manual," found at ftp://ftp.merl.com/pub/avetro/3dv-cfp/software/, dated Feb. 19, 2008-Aug. 27, 2009, 3 pp.
Chen, et al., "Description of 3D video technique proposal by Qualcomm Incorporated," M22583, MPEG of ISO/IEC/JTC1/SC29/WG11, Geneva, Switzerland, 21 pp., Nov. 2011.
De Silva et al., "Display Dependent Preprocessing of Depth Maps Based on Just Noticeable Depth Difference Modeling," IEEE Journal of Selected Topics in Signal Processing, vol. 5, No. 2, Apr. 2011, pp. 335-351.
Grewatsch et al., "Sharing of Motion Vectors in 3D Video Coding", 2004 International conference on Image Processing (ICIP), University of Rostock Institute of Communications Engineering, Germany, pp. 3271-3274.
Hannuksela M.M., "3DV-ATM Slice Header Prediction", 99. MPEG Meeting; Jun. 2, 2012-Oct. 2, 2012; San Josa CR ; (Motion Picture Expert Group or ISO/IEC JTC1/SC29/WG11), No. M23697, Jun. 7, 2012 (Jun. 7, 2012), pp. 1-11, XP030052222.
International Search Report and Written Opinion—PCT/US2012/047705—ISA/EPO—Oct. 2, 2012 13 pp.
ISO/IEC JTC 1/SC 29, ISO/IEC 14496-5:2001/FDAM 15:2009(E), ISO/IEC JTC 1/SC 29/WG 11, Information technology—Coding of audio-visual objects—Part 5: Reference software, Amendment 15: Reference software for Multiview Video Coding, 5 pp. Dec. 2009.
Itu-T H.264, Series H: Audiovisual and Multimedia Systems, Infrastructure of audiovisual services—Coding of moving video, Advanced video coding for generic audiovisual services, Mar. 2010, 676 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 686 pp.
Lee J., et al., "Description of AVC compatible 3D video coding technology by Samsung", 98. MPEG Meeting; Nov. 28, 2011-Dec. 2, 2011; Geneva; (Motion Picture Expert Group or ISO/IEC JTC1/SC29/WG11), No. M22632, Nov. 27, 2011 (Nov. 27, 2011), pp. 1-24, XP030051195.
Merkle, et al., "Multi-View Video Plus Depth Representation and Coding," IEEE International Conference on Image Processing, 2007, ICIP 2007, Sep. 16, 2007-Oct. 19, 2007, pp. 201-204, vol. 1.
Oh H., et al., "H.264-Based Depth Map Sequence Coding Using Motion Information of Corresponding Texture Video", Gwangju Institute of Science and Texchnology (GIST), Korea, 2006, pp. 898-907.
"Report on Experimental Framework for 3D Video Coding," ISO/IEC JTC1/SC29/WG11, MPEG2010/N11631, Guangzhou, China, 10 pp. Oct. 2010.
Sullivan, et al., Editors' draft revision to ITU-T Rec. H.264 ISO/IEC 14496-10 Advanced Video Coding—in preparation for ITU-T SG 16 AAP Consent (in integrated form), Joint Video Team (JVT) of ISO/IEC MPEG & ITU-T VCEG (ISO/IEC JTC1/SC29/WG11 AND ITU-T SG16 Q.6), Document: JVT-AA007, Filename: JVT-AD007.doc, 30th Meeting: Geneva, CH, 683 pp. Jan. 29-Feb. 3, 2009.
Suzuki T., et al., "WD on MVC extensions for inclusion of depth maps", ISO/IEC/JTC1/SC29/WG11/N12351, No. M23805 WD, Jun. 7, 2012 (Jun. 7, 2012), pp. 1-24, XP002684667.
Tian D., et al., "On 2D + Depth SEI Message", 88. MPEG Meeting; Apr. 20, 2009-Apr. 24, 2009; Maui; (Motion Picture Expert Group or ISO/I EC JTC1/SC29/WG11),, No. M16320, Apr. 14, 2009 (Apr. 14, 2009), pp. 1-10, XP030044917.
Tian D., et al., "On spatially interleaved pictures SEI", 30. JVT Meeting; Jan. 29, 2009-Feb. 2, 2009; Geneva, ; (Joint Video Team of ISO/IEC JTC1/SC29/ WG11 and ITU-T SG. 16), No. JVT-AD017, Jan. 29, 2009 (Jan. 29, 2009), pp. 1-12, XP030007452, ISSN: 0000-0079.
U.S. Appl. No. 13/553,315, by Ying Chen, filed Jul. 19, 2012.
U.S. Appl. No. 13/553,617, by Ying Chen et al., filed Jul. 19, 2012.
U.S. Appl. No. 13/678,374, by Li Zhang et al., filed Nov. 15, 2012.
"VSRS Software Manual", SoftwareManualVSRS, version VSRS 3.0, found at ftp://ftp.merl.com/pub/avetro/3dv-cfp/software/, May 28, 2009, 19 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.
Wiegand T. et al., "WD2: Working Draft 2 of High-Efficiency Video Coding", (Jan. 28, 2011), No. JCTVC-D503, Jan. 28, 2011 (Jan. 28, 2011), XP002679642, Retrieved from the Internet: URL: http://wftp3.itu.int/av-archictvc-site/2011_01_D_Daegu/ [retrieved on Jul. 11, 2012].
Zhang, Jun, et al., "Joint Multiview Video Plus Depth Coding", IEEE 17th International Conference on Image Processing, Hong Kong, Sep. 26-29, 2010, pp. 2865-2868.
Notice of Grounds for Rejection from Korean counterpart application No. 2014-7004644, dated Mar. 21, 2014, 8 pp.
Riabtsev, "MPEG-4 AVC/H.264 Motion Vector Prediction Rev. 4," available at http://www.academia.edu/6574861/MPEG-4_AVC_H.264_Motion_Vector_Prediction, received from USPTO on Feb. 10, 2015 (no other date available), 18 pp.
Hannuksela, "3DV-ATM Slice Header Prediction," MPEG Meeting; San Jose, CA ; (Motion Picture Expert Group or ISO/IEC JTC1/SC29/WG11), No. M23697, Feb. 1, 2012, XP030052222, 11 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
3GPP TS 26244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
Bross et al., "WD5: Working Draft 5 of High-Efficiency Video Coding," JCTVC-G1103, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.
Chen, et al., "Low-Complexity Asymmetric Multiview Video Coding," 2008 IEEE International Conference on Multimedia and Expo, ICME Apr. 26-Jun. 23, 2008, pp. 773-776.
Chen, et al., "Picture-Level Adaptive Filter for Asymmetric Stereoscopic Video," 15th IEEE International Conference on Image Processing, ICIP Oct. 12-15, 2008, pp. 1944-1947.
Chen, et al., "Regionally Adaptive Filtering for Asymmetric Stereoscopic Video Coding," IEEE International Symposium on Circuits and Systems, May 24-27, 2009, ISCAS 2009. pp. 2585-2588.
C-Y Tsai et al., CE4 Subset3: Slice Common Information Sharing, Mar. 7, 2011, No. JCTVC-E045, Mar. 7, 2011 (Mar. 7, 2011), XP030008551, ISSN: 0000-0007. 7 pp.
Hannuksela et al., "3D-AVC Draft Text 8," Joint Collaborative Team on 3D Video Coding Extension Developmentof ITU-T SG 16 WP 3 AND ISO/IEC JTC 1/SC 29/WG 11, Document: JCT3VF1002_v3, Oct. 25-Nov. 1, 2013, 62 pp.
He Wenge et al., "Asymmetric Stereoscopic Video Encoding Algorithm Based on Joint Compensation Prediction", IEEE International Conference on Communications and Mobile Computing, Jan. 6, 2009 (Jan. 6, 2009), pp. 191-194, XP031434775, ISBN: 978-0-7695-3501-2.
ITU-T H265, Series H: Audiovisual and Multimedia Systems, Infrastructure of audiovisual services—Coding of moving video, High efficiency video coding, The International Telecommunication Union, Apr. 2015, 634 pp.
"ITU-T H265, Series H: Audiovisual and Multimedia Systems, Infrastructure of audiovisual services—Coding of moving video, High efficiency video coding, The International Telecommunication Union, Oct. 2014, 540 pp."

Jiang X., et al., "DIBR-Based 3D Videos Using Non Video Rate Range Image Stream," International Conference on Multimedia and Expo, IEEE, Jul. 9-12, 2006, pp. 1873-1876.
"Joint Draft 8.0 on Multiview Video Coding", 28th JVT meeting, Hannover, Germany, Document: JVT-AB204 (rev.1), Jul. 20-25, 2008. available from http:// wftp3. itu.int/av-arch/jvt-site/2008_07_Hannover/JVT-AB204. 73 pp.
JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip. 689 pp.
Kamolrat B., et al., "3D motion estimation for depth image coding in 3D video coding," IEEE Transactions on Consumer Electronics, IEEE, May 2009, vol. 55, No. 2, pp. 824-830.
Kauff P.,et al., "Depth Map Creation and Image-Based Rendering for Advanced 3DTV Services Providing Interoperability and Scalability", Signal Processing. Image Communication, Elsevier Science Publishers, Amsterdam, NL, Mar. 16, 2007 (Mar. 16, 2007), vol. 22, No. 2, pp. 217-234, XP005938670, ISSN: 0923-5965, DOI: 10.1016/J.IMAGE.2006.11.013.
Misra K., et al., "Entropy Slices for Parallel Entropy Coding", Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C256, pp. 1-6.
Ouedraogo N., et al., "Results on Slice Header Modifications", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F503, pp. 1-9.
Schwarz H., et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 1, 2007 (Sep. 1, 2007), pp. 1103-1120, XP011193019, ISSN: 1051-8215, DOI: 10.1109/TCSVT.2007.905532, section V-C.1; p. 1113, right-hand column-p. 1114, left-hand column figure 8.
Seo et al., "Motion information sharing mode for depth video coding", 3DTV-conference: The True Vision—Capture, Transmission and Display of 3D Video (3DTV-CON), 2010, Jun. 7, 2010, pp. 1-4, IEEE, XP031706528, ISBN: 978-1-4244-6377-0, DOI: 10.1109/3DTV.2010.5506505.
Vetro, et al., "Joint Multiview Video Model (JMVM) 2.0," Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, JVT-U207, 11 pages.
Video and Requirements: "Applications and Requirements on 3D Video Coding", ISO/IEC JTC1/SC29/WG11 MPEG2011/N12035, Mar. 2011, pp. 1-7, URL, ftp://ftp.merl.com/pub/avetro/3dv-cfp/docs/w12035.zip.
Wildeboer M.O., et al., "Depth up—sampling for depth coding using view information", Proc. of 3DTV Conference, May 2011, pp. 1-6.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, http://wftp3.itu.int/av-arch/jvt-site/2009_01_Geneva/JVT-AD007.zip, 689 pp.
Vetro et al. "Joint Draft 8.0 on Multiview Video Coding", 28th JVT meeting, Hannover, Germany, Document: JVT-AB204 (rev.1), Jul. 20-25, 2008. Available from http:// wftp3. itu.int/av-arch/jvt-site/2008_07_Hannover/JVT-AB204, 73 pp.

* cited by examiner

SLICE HEADER THREE-DIMENSIONAL VIDEO EXTENSION FOR SLICE HEADER PREDICTION

This application claims the benefit of U.S. Provisional Applications No. 61/510,738, filed Jul. 22, 2011, No. 61/522,584, filed Aug. 11, 2011, No. 61/563,772, filed Nov. 26, 2011, No. 61/595,612, filed Feb. 6, 2012, No. 61/624,031, filed Apr. 13, 2012, and No. 61/637,212, filed on Apr. 23, 2012, each of which is hereby incorporated by reference in its entirety.

TECHNICAL FIELD

This disclosure relates to the field of video coding, e.g., coding three dimensional video data.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file corresponding to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28th JVT meeting, Hannover, Germany, July 2008, available at wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from wftp3.itu.int/av-arch/jvt-site/2009_01_Geneva/JVT-AD007.zip. This document integrates SVC and MVC in the AVC specification.

SUMMARY

In general, this disclosure describes techniques for supporting three-dimensional (3D) video rendering. In particular, the techniques of this disclosure relate to coding and decoding 3D video content. This disclosure also proposes signaling techniques for coded block units of video data. For example, this disclosure proposes reusing syntax elements included in a slice header of texture view components for corresponding depth view components, and vice-versa. Additionally, this disclosure proposes reusing syntax elements in header information, for example, slice header information of depth view components for texture view components.

In a 3D codec, a view component of each view of video data in a specific time instance may include a texture view component and a depth view component. The texture view component may include luminance (Y) components and chrominance (Cb and Cr) components. Luminance (brightness) and chrominance (color) components are collectively referred to herein as "texture" components. The depth view component may be from a depth map of an image. In 3D image rendering, depth maps include depth components that are representative of depth values, e.g., for corresponding texture components. Depth view components can be used for generating virtual views from a given viewing perspective.

Syntax elements for depth components and texture components may be signaled with a coded block unit. Coded block units, also referred to simply as "coded blocks" in this disclosure, may correspond to macroblocks in ITU-T H.264/AVC (Advanced Video Coding) or coding units of High Efficiency Video Coding (HEVC).

In one aspect, a method of coding video data includes coding one or more blocks of video data representative of texture information of at least a portion of a frame of the video data. The method further includes processing a texture slice for a texture view component of a current view associated with an access unit, the texture slice comprising the coded one or more blocks and a texture slice header comprising a set of syntax elements representative of characteristics of the texture slice. The method also includes coding depth information representative of depth values for at least the portion of the frame. The method further includes processing a depth slice for a depth view component corresponding to the texture view component of the view, the depth slice comprising the coded depth information and a depth slice header comprising a set of syntax elements representative of characteristics of the depth slice. Processing the texture slice or the depth slice may further include predicting at least one syntax element of at least one of the set of syntax elements representative of characteristics of the texture slice or set of syntax elements representative of characteristics of the depth slice from a reference slice header, respectively, wherein the reference slice header is from a view component of the same access unit.

In another aspect, this disclosure describes a device for coding data. The device includes a video coder configured to code one or more blocks of video data representative of texture information of at least a portion of a frame of the video data, process a texture slice for a texture view component of a current view associated with an access unit, the texture slice comprising the coded one or more blocks and a texture slice header comprising a set of syntax elements representative of characteristics of the texture slice, code depth information representative of depth values for at least the portion of the frame, and process a depth slice for a depth view component corresponding to the texture view component of the view, the depth slice comprising the coded depth information and a depth slice header comprising a set of syntax elements representative of characteristics of the depth slice, wherein processing the texture slice or the depth slice comprises predicting at least one syntax element of at least one of the set of syntax elements representative of characteristics of the texture slice or set of syntax elements representative of characteristics of the depth slice from a reference slice header, respectively, wherein the reference slice header is from a view component of the same access unit.

In yet another aspect, this disclosure describes a computer program product that may be configured to execute on or more of the described techniques. The computer program product includes a computer-readable storage medium having stored thereon instructions that, when executed, cause a processor of a video coding device to code one or more blocks of video data representative of texture information of at least a portion of a frame of the video data. The instructions further cause the processor to process a texture slice for a texture view component of a current view associated with an access unit, the texture slice comprising the coded one or more blocks and a texture slice header comprising a set of syntax elements representative of characteristics of the texture slice. The instructions further cause the processor to code depth information representative of depth values for at least the portion of the frame. Also, the instructions further cause the processor to process a depth slice for a depth view component corresponding to the texture view component of the view, the depth slice comprising the coded depth information and a depth slice header comprising a set of syntax elements representative of characteristics of the depth slice, wherein process the texture slice or the depth slice comprises predict at least one syntax element of at least one of the set of syntax elements representative of characteristics of the texture slice or set of syntax elements representative of characteristics of the depth slice from a reference slice header, respectively, wherein the reference slice header is from a view component of the same access unit.

In another aspect, a device for processing video data is described that includes means for coding one or more blocks of video data representative of texture information of at least a portion of a frame of the video data. The device further includes means for processing a texture slice for a texture view component of a current view associated with an access unit, the texture slice comprising the coded one or more blocks and a texture slice header comprising a set of syntax elements representative of characteristics of the texture slice and means for coding depth information representative of depth values for at least the portion of the frame. The device is further includes means for processing a depth slice for a depth view component corresponding to the texture view component of the view, the depth slice comprising the coded depth information and a depth slice header comprising a set of syntax elements representative of characteristics of the depth slice, wherein means for processing the texture slice or the depth slice comprises means for predicting at least one syntax element of at least one of the set of syntax elements representative of characteristics of the texture slice or set of syntax elements representative of characteristics of the depth slice from a reference slice header, respectively, wherein the reference slice header is from a view component of the same access unit.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

This disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
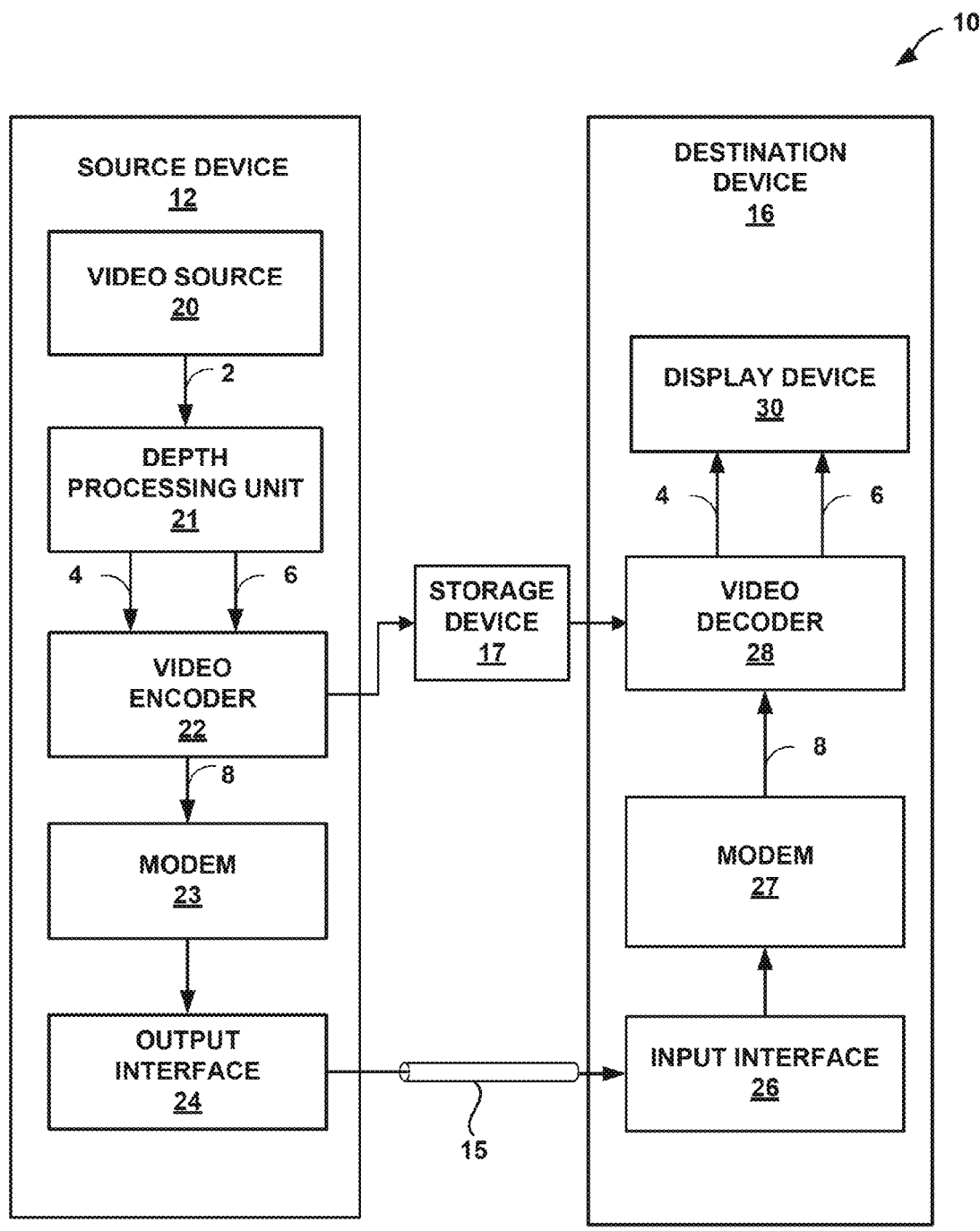
FIG. 1 is a block diagram illustrating one example of a video encoding and decoding system, according to techniques of the present disclosure.

This disclosure describes techniques that an encoder may apply and a decoder may use during at least the inter-prediction stage of at least a video encoding or decoding process. The described techniques are related to the coding of three-dimensional ("3D") video content. The 3D video content may be represented, for example, as multi view video plus depth ("MVD") coded blocks. That is, these techniques may be applied to encode or decode a bitstream resembling a multiview video coding (MVC) bitstream, where any or all views of the MVC bitstream may further include depth information. As described herein, signaling takes place in a coded bitstream.

More specifically, some techniques according to this disclosure involve receipt of at least one two-dimensional image having texture view components and depth view components. Some texture view components and depth view components may be encoded together into a single coded block or as separate blocks. An image may be broken into slices of images. Syntax elements for coding texture view components may be signaled in a slice header. Some syntax elements for the depth view components may be predicted from the syntax elements for the texture view components corresponding to the depth view components. The techniques of this disclosure relate to encoding, decoding, and signaling of data used to render three-dimensional video data from two-dimensional video data, based on estimated depth map data for the two-dimensional video data. In some examples, the texture view components are encoded using different techniques than used for encoding the depth information. In this disclosure, the term "coding" may refer to either or both of encoding and decoding.

Video conversion based on depth estimation and virtual view synthesis is used to create 3D images, such as for 3D video applications. In particular, virtual views of a scene may be used to create a 3D view of the scene. Generation of a virtual view of a scene based on an existing view of the scene is conventionally achieved by estimating object depth values before synthesizing the virtual view. Depth estimation is a process of estimating absolute or relative distances between objects and a camera plane from stereo pairs or monoscopic content. As used herein, depth information includes information useful in processing three-dimensional video, such as a depth map (e.g., depth values on a per-pixel basis) or a parallax map (e.g., horizontal disparity on a per-pixel basis).

The estimated depth information, usually represented by a grey-level image depth map, can be used to generate an arbitrary angle for virtual views using depth image based rendering (DIBR) techniques. Compared to the traditional three-dimensional television (3DTV) systems where multi-view sequences face the challenges of efficient inter-view compression, a depth map based system may reduce the usage of bandwidth by transmitting only one or a few views together with the depth map(s), which can be efficiently encoded. The depth map(s) used in depth map based conversion can be controllable (e.g., through scaling) by end users before the depth map(s) are used in view synthesis. Customized virtual views may be generated with different amount of perceived depth. Also, an estimation of depth can be performed using monoscopic video wherein only a one view 2D content is available.

Some techniques of this disclosure will be described with reference to the multi-view video coding (MVC) extension of the H.264/AVC (advanced video coding) standard. The latest joint draft of MVC is described in JVT-AD007, "Editors' draft revision to ITU-T Rec. H.264|ISO/IEC 14496-10 Advanced Video Coding," 30$^{th}$ JVT meeting, Geneva, Switzerland, January-February 2009, available from wftp3.itu.int/av-arch/jvt-site/2009_01_Geneva/JVT-AD007, which is hereby incorporated by reference. While the following description will be in terms of H.264/AVC, it should be understood that the techniques of this disclosure may be applicable for use with other multi-view video coding processes, or with future multi-view o to currently proposed video coding standards.

In H.264/AVC, each network abstraction layer (NAL) unit, if containing coded video data, has a slice header. The slice header may contain the following information: slice address, location of the starting macroblock, the slice type, the picture parameter set (PPS) to be used and the delta quantization parameter (QP) between the initial QP of the slice and the QP signaled in the PPS, the order of the reference pictures (frame_num) and the display order of the current picture (e.g., the picture order count (POC)), reference picture list construction related syntax elements, memory management control operation related syntax elements, weighted prediction related syntax elements.

Techniques described herein may be applied to predict syntax elements for a depth view component from syntax elements stored in a slice header for co-located texture view components of the same view. For example, values for syntax elements that are common to the depth slice and the texture slice may be included in the slice header for the texture view components but not in the slice for the associated depth view components. That is, a video encoder or decoder may code syntax elements that are common to the depth slice and the texture slice in the slice header for the texture view components which are not present in the slice header for the depth view components. For example, a first value may be defined for a first syntax element in the slice header for the texture view components. The slice header for the depth view components also shares the first syntax element, meaning the first syntax element is common to both the texture slice header and the depth slice header. The first syntax element for the depth view components has a second value. However, the slice header for the depth view component does not include the first syntax element. According to techniques described herein, the second value of the first syntax element may be predicted from the first value.

This disclosure presents the following techniques for slice header prediction. According to one example of the disclosure, prediction is controlled at the slice header level and the reference slice header may be defined as being a view component in the same view of the same access unit as the current view or an AVC compatible base view texture of the same access unit as the current view.

In another example, the reference slice header of a depth view component may be either the slice header of the texture view component in the same view or the slice header of the depth view component of the first view in decoding order. In another example, a delta view order index id may be signaled to indicate which view in the same access unit the slice header is predicted from.

In some examples, a flag may be signaled to indicate if the reference slice header is from the depth view component or the texture view component of a specific view. In another example, syntax elements in the slice header extension, if present in the slice header, may be re-ordered in a way that is different from the slice header syntax elements in AVC slice header.

In yet another example, the syntax elements slice_type, num_ref_idx_l0_active_minus1, num_ref_idx_l1_active_minus1 and reference picture list modification may be selectively predicted. That is, they may or may not be predicted based on a control flag in each slice header 3DV extension. When prediction of the reference picture list modification is enabled, it may be possible to refine the reference picture list modification based on a newly introduced reference picture list exclusion or insertion syntax table.

In another example of the disclosure, after a depth or texture view component is indicated, a slice ID of the slice of a given view component in an access unit may be further signaled. In some examples, the access unit comprising the slice of the given view component may be the same access unit corresponding to the depth or texture view component.

In another example of the disclosure, a slice ID may be signaled for each slice of each view component. The slice ID may be signaled either in the slice header or in the NAL unit header. Further, the above indications may be signaled in the slice header 3DV extension.

Techniques of the disclosure may utilize block based inter-coding. Block based inter-coding is a coding technique that relies on temporal prediction to reduce or remove temporal redundancy between video blocks of successive coded units of a video sequence. The coded units may comprise video frames, slices of video frames, groups of pictures, or another defined unit of encoded video blocks. For inter-coding, a video encoder performs motion estimation and motion compensation to estimate motion between video blocks of two or more adjacent coded units. Using techniques for motion estimation, the video encoder generates motion vectors, which indicate displacement of video blocks relative to corresponding prediction video blocks in one or more reference frames or other coded units. Using techniques for motion compensation, the video encoder uses the motion vectors to generate prediction video blocks from the one or more reference frames or other coded units. After motion compensation, the video encoder calculates residual video blocks by subtracting prediction video blocks from the original video blocks being coded.

Reference view components (RVCs) may include multiple texture or depth slices. In some examples, where the reference view components comprise multiple slices, a co-located slice may be used when determining the syntax elements of a current slice. Alternatively, a first slice in the RVC may be used to determine syntax elements of the current slice. In other examples, another slice in the RVC may be used to determine common syntax elements of the current slice.

FIG. 1 is a block diagram illustrating one example of a video encoding and decoding system 10, according to techniques of the present disclosure. As shown in the example of FIG. 1, system 10 includes a source device 12 that transmits encoded video to a destination device 16 via a link 15. Link 15 may comprise any type of medium or device capable of moving the encoded video data from source device 12 to destination device 16. In one example, link 15 comprises a communication medium to enable source device 12 to transmit encoded video data directly to destination device 16 in real-time. The encoded video data may be modulated according to a communication standard, such as a wireless communication protocol, and transmitted to destination device 16. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 16.

Source device 12 and destination device 16 may comprise any of a wide range of devices. In some examples, either or both of source device 12 and destination device 16 may comprise wireless communication devices, such as wireless handsets, so-called cellular or satellite radiotelephones, or any wireless devices that can communicate video information over link 15, in which case link 15 is wireless. The techniques of this disclosure, however, which concern coding blocks of video data that include both texture and depth information, are not necessarily limited to wireless applications or settings. The techniques may also be useful in a wide range of other settings and devices, including devices that communicate via physical wires, optical fibers or other physical or wireless media. In addition, the encoding or decoding techniques may also be applied in a standalone device that does not necessarily communicate with any other device. For example, video decoder 28 may reside in a digital media player or other device and receive encoded video data via streaming, download or storage media. Hence, the depiction of source device 12 and destination device 16 in communication with one another is described for purposes of illustration of an example implementation, and should not be consider limiting as to the techniques described in this disclosure, which may be applicable to video coding in general in a variety of environments, applications or implementations.

Alternatively, encoded data may be output from output interface 24 to a storage device 17. Similarly, encoded data may be accessed from storage device 17 by video decoder 28. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 16 may access stored video data from storage device 17 via streaming or download. The file server may be any type of server capable of storing encoded video data and transmitting that encoded video data to the destination device 16. Example file servers include a web server (e.g., for a website), an FTP server, network attached storage (NAS) devices, or a local disk drive. Destination device 16 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

In the example of FIG. 1, source device 12 includes a video source 20, depth processing unit 21, video encoder 22, and output interface 24. Destination device 16 includes an input interface 26, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Video encoder 22 may also apply transform, quantization, and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values is converted into transform coefficients, which represents the energy of the pixel values in the frequency domain. Video encoder 22 may also quantize the transform coefficients, which may generally involve a process that reduces the number of bits associated with the corresponding transform coefficient. Entropy coding may include one or more processes that collectively compress data for output to a bitstream, where the compressed data may include, for example, a sequence of coding modes, motion information, coded block patterns, and quantized transform coefficients. Examples of entropy coding include, but are not limited to, context adaptive variable length coding (CAVLC) and context adaptive binary arithmetic coding (CABAC).

A coded video block may be represented by prediction information that can be used to create or identify a predictive block, and a residual block of data that can be applied to the predictive block to recreate the original block. The prediction information may comprise the one or more motion vectors that are used to identify the predictive block of data. Using the motion vectors, video decoder 28 may be able to reconstruct the predictive blocks that were used to code the residual blocks. Thus, given a set of residual blocks and a set of motion vectors (and possibly some additional syntax), video decoder 28 can reconstruct a video frame that was originally encoded. Inter-coding based on motion estimation and motion compensation can achieve relatively high amounts of compression without excessive data loss, because successive video frames or other types of coded units are often similar. An encoded video sequence may comprise blocks of residual data, motion vectors (when inter-prediction encoded), indications of intra-prediction modes for intra-prediction, and syntax elements.

Video encoder 22 may also utilize intra-prediction techniques to encode video blocks relative to neighboring video blocks of a common frame or slice. In this manner, video encoder 22 spatially predicts the blocks. Video encoder 22 may be configured with a variety of intra-prediction modes, which generally correspond to various spatial prediction directions. As with motion estimation, video encoder 22 may be configured to select an intra-prediction mode based on a luminance component of a block, then reuse the intra-prediction mode to encode chrominance components of the block. Moreover, in accordance with the techniques of this disclosure, video encoder 22 may reuse the intra-prediction mode to encode a depth component of the block.

By reusing motion and intra-prediction mode information to encode a depth component of a block, these techniques may simplify the process of encoding depth maps. Moreover, the techniques described herein may improve bitstream efficiency. That is, the bitstream need only to indicate some syntax elements once in a slice header for texture view component, rather than signal additional syntax element in a slice header for a slice of depth view components.

Optionally, a texture view component may also reuse its corresponding depth view component in the same way.

Again, the illustrated system 10 of FIG. 1 is merely one example. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12 and 16 may operate in a substantially symmetrical manner, such that each of devices 12 and 16 include video encoding and decoding components. Hence, system 10 may support one-way or two-way video transmission between video devices 12 and 16, e.g., for video streaming, video playback, video broadcasting, or video telephony.

Video source 20 of source device 12 includes a video capture device, such as a video camera, a video archive containing previously captured video, or a video feed from a video content provider. Alternatively, video source 20 may generate computer graphics-based data as the source video, or a combination of live video, archived video, and/or computer-generated video. In some cases, if video source 20 is a video camera, source device 12 and destination device 16 may form so-called camera phones or video phones, or other mobile devices configured to manipulate video data, such as tablet computing devices. In each case, the captured, pre-captured or computer-generated video may be encoded by video encoder 22. Video source 20 captures a view and forwards it to depth processing unit 21.

Video source 20 sends view 2 to depth processing unit 21 for calculation of depth image for objects in view 2. In some examples, view 2 comprises more than one view. A depth image is determined for objects in view 2 captured by video source 20. Depth processing unit 21 is configured to automatically calculate depth values for objects in the image of view 2. For example, depth processing unit 21 calculates depth values for objects based on luminance information. In some examples, depth processing unit 21 is configured to receive depth information from a user. In some examples, video source 20 captures two views of a scene at different perspectives, and then calculates depth information for objects in the scene based on disparity between the objects in the two views. In various examples, video source 20 comprises a standard two-dimensional camera, a two camera system that provides a stereoscopic view of a scene, a camera array that captures multiple views of the scene, or a camera that captures one view plus depth information.

Depth processing unit 21 sends texture view components 4 and depth view components 6 to video encoder 22. Depth processing unit 21 may also sends view 2 directly to video encoder 22. Depth information 6 comprises a depth map image for view 2. A depth map image may comprise a map of depth values for each region of pixels associated with an area (e.g., block, slice, or frame) to be displayed. A region of pixels includes a single pixel or a group of one or more pixels. Some examples of depth maps have one depth component per pixel. In other examples, there are multiple depth components per pixel. Depth maps may be coded in a fashion substantially similar to texture data, e.g., using intra-prediction or inter-prediction relative to other, previously coded depth data. In other examples, depth maps are coded in a different fashion than the texture data is coded.

The depth map may be estimated in some examples. When more than one view is present, stereo matching can be used to estimate depth maps. However, in 2D to 3D conversion, estimating depth may be more difficult. Nevertheless, depth map estimated by various methods may be used for 3D rendering based on Depth-Image-Based Rendering (DIBR).

Although video source 20 may include multiple views of a scene and depth processing unit 21 may calculate depth information based on the multiple views, source device 12 may generally transmit one view plus depth information for each view of a scene.

When view 2 is a digital still picture, video encoder 22 may be configured to encode view 2 as, for example, a Joint Photographic Experts Group (JPEG) image. When view 2 is a frame of video data, video encoder 22 is configured to encode first view 50 according to a video coding standard such as, for example Motion Picture Experts Group (MPEG), International Organization for Standardization (ISO)/International Electrotechnical Commission (IEC) MPEG-1 Visual, ISO/IEC MPEG-2 Visual, ISO/IEC MPEG-4 Visual, International Telecommunication Union (ITU) H.261, ITU-T H.262, ITU-T H.263, ITU-T H.264/MPEG-4, H.264 Advanced Video Coding (AVC), the upcoming High Efficiency Video Coding (HEVC) standard (also referred to as H.265), or other video encoding standards. Video encoder 22 may include depth information 6 along with the encoded image to form coded block 8, which includes encoded image data along with depth information 6. Video encoder 22 passes coded block 8 to output interface 24. Coded block 8 may be transferred to input interface 26 in a bitstream including signaling information along with coded block 8 over link 15.

The encoded video information includes texture components 4 and depth information 6. Texture components 4 may include luminance (luma) and chrominance (chroma) components of video information. Luma components generally describe brightness, while chrominance components generally describe hues of color. Depth processing unit 21 extracts depth information 6 from a depth map of view 2. Video encoder 22 may encode texture view components 4 and depth view components 6 into a single coded block 8 of encoded video data. Likewise, video encoder 22 may encode the block such that motion or intra-prediction mode information for the luma component is reused for the chroma components and the depth component. Syntax elements used for the texture view components may be used to predict similar syntax elements for the depth view components.

In some examples, the depth map view component may not be encoded using inter-view prediction techniques even when the corresponding texture view component is encoded using inter-view prediction techniques. For example, the depth map view component may be predicted using intra-view prediction when the corresponding texture view component is predicted using inter-view prediction. For example, inter-view predicting a texture view component predicts the texture view information from data of a different view as view corresponding to the texture view component. In contrast, intra-view predicting depth view information predicts the depth information from data of the same view as the view corresponding to the depth view information.

Despite using different prediction techniques, some syntax elements for the depth map view component may be predicted from the corresponding syntax elements in the slice header of the corresponding texture view component, or vice-versa. However, the slice header information for the depth map view component may contain information related to a reference picture list construction. That is, information related to the reference picture list construction may be signaled in the slice header for the depth map view component. For example, a number of reference pictures that are used and an indication of which reference pictures are used to predict the depth map view component may be signaled in the slice header for the depth map view component. Similar information may also be signaled in a slice header for the corresponding texture view component.

In some examples, source device 12 includes a modem that modulates coded block 8 according to a communication standard, e.g., such as code division multiple access (CDMA) or another communication standard. A modem may include various mixers, filters, amplifiers or other components designed for signal modulation. Output interface 24 may include circuits designed for transmitting data, including amplifiers, filters, and one or more antennas. Coded block 8 is transmitted to destination device 16 via output interface 24 and link 15. In some examples, rather than transmitting over a communication channel, source device 12 stores encoded video data, including blocks having texture and depth components, onto a storage device 32, such as a digital video disc (DVD), Blu-ray disc, flash drive, or the like.

Input interface 26 of destination device 16 receives information over link 15. In some examples, destination device 16 includes a modem that demodulates the information. Like output interface 24, input interface 26 may include circuits designed for receiving data, including amplifiers, filters, and one or more antennas. In some instances, output interface 24 and/or input interface 26 may be incorporated within a single transceiver component that includes both receive and transmit circuitry. A modem may include various mixers, filters, amplifiers or other components designed for signal demodulation. In some instances, a modem may include components for performing both modulation and demodulation.

Again, the video encoding process performed by video encoder 22 may implement one or more of the techniques described herein during inter-prediction encoding, which may include motion estimation and motion compensation, and intra-prediction encoding. The video decoding process performed by video decoder 28 may also perform such techniques during a motion compensation stage of the decoding process.

The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. The terms "coded block," "coded block unit," or "coded unit" may refer to any independently decodable unit of a video frame such as an entire frame, a slice of a frame, a block of video data, or another independently decodable unit defined according to the coding techniques used.

Display device 30 displays the decoded video data to a user, and may comprise any of a variety of one or more display devices such as a cathode ray tube (CRT), a liquid crystal display (LCD), a plasma display, an organic light emitting diode (OLED) display, or another type of display device. In some examples, display device 30 corresponds to a device capable of three-dimensional playback. For example, display device 30 may comprise a stereoscopic display, which is used in conjunction with eyewear worn by a viewer. The eyewear may comprise active glasses, in which case display device 30 rapidly alternates between images of different views synchronously with alternate shuttering of lenses of the active glasses. Alternatively, the eyewear may comprise passive glasses, in which case display device 30 displays images from different views simultaneously, and the passive glasses may include polarized lenses that are generally polarized in orthogonal directions to filter between the different views.

In the example of FIG. 1, link 15 may comprise any wireless or wired communication medium, such as a radio frequency (RF) spectrum or one or more physical transmission lines, or any combination of wireless and wired media. Link 15 may form part of a packet-based network, such as a local area network, a wide-area network, or a global network such as the Internet. Link 15 generally represents any suitable communication medium, or collection of different communication media, for transmitting video data from source device 12 to destination device 16. Link 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). Additional video compression standards that are based on the ITU H.264/AVC standard that may be used by video encoder 22 and video decoder 28 include the scalable video coding (SVC) standard, which is a scalable extension to the ITU H.264/AVC standard. Another standard that video encoder 22 and video decoder 28 may operate according to includes the multi-view video coding (MVC) standard, which is a multiview extension to the ITU H.264/AVC standard. The techniques of this disclosure, however, are not limited to any particular video coding standard.

In some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. When any or all of the techniques of this disclosure are implemented in software, an implementing device may further include hardware for storing and/or executing instructions for the software, e.g., a memory for storing the instructions and one or more processing units for executing the instructions. Each of video encoder 22 and video decoder 28 may be included in one or more encoders or decoders, either of which may be integrated as part of a combined codec that includes encoding and decoding capabilities in a respective mobile device, subscriber device, broadcast device, server, or the like.

A video sequence typically includes a series of video frames, also referred to as video pictures. Video encoder 22 operates on video blocks within individual video frames in order to encode the video data. The video blocks may have fixed or varying sizes, and may differ in size according to a specified coding standard. Each video frame includes a series of one or more slices. In the ITU-T H.264 standard, for example, each slice includes a series of macroblocks, which may be arranged into sub-blocks. The H.264 standard supports intra prediction in various block sizes for two dimensional (2D) video encoding, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process. These techniques may be extended to 3D video.

The 2D macroblocks of the ITU-T H.264 standard may be extended to 3D by encoding depth information from a depth map or parallax map together with associated luma and chroma components (that is, texture components) for that video frame or slice. Parallax mapping (also referred to as virtual displacement mapping or offset mapping) displaces texture view components at a pixel location based on a function of a view angle and a height map at the pixel location. Video encoder 22 may encode the depth information as monochromatic video.

To encode the video blocks, such as a coded block, video encoder 22 performs intra- or inter-prediction to generate one or more prediction blocks. Video encoder 22 subtracts the prediction blocks from the original video blocks to be encoded to generate residual blocks. Thus, the residual blocks may represent pixel-by-pixel differences between the blocks being coded and the prediction blocks. Video encoder 22 may perform a transform on the residual blocks to generate blocks of transform coefficients. Following intra- or inter-based predictive coding and transformation techniques, video encoder 22 may quantize the transform coefficients. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). Additional details of an encoding process performed by video encoder 22 are described below with respect to FIG. 2.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 includes nine intra-prediction encoding modes, HM includes as many as thirty-three intra-prediction encoding modes. HEVC may be extended to support the slice header information techniques as described herein.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. A coded block may be a CU according to the HM standard. Thus, a CU may be split into sub-CUs. In general, references in this disclosure to a CU may refer to a largest coding unit (LCU) of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, prediction unit (PU), or transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may include syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. The motion vector may also be treated as having different resolutions for texture view components and depth view components. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, video encoder 22 may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU of a current CU of a picture from previously coded CUs of the same picture. More specifically, video encoder 22 may intra-predict a current CU of a picture using a particular intra-prediction mode. An HM encoder may be configured with up to thirty-three intra-prediction modes. Therefore, to support a one-to-one mapping between directional intra-prediction modes and directional transforms, HM encoders and decoders would need to store 66 matrices for each supported transform size. Furthermore, the block sizes for which all thirty-three intra-prediction modes are supported may be relatively large blocks, e.g., 32×32 pixels, 64×64 pixels, or even larger.

In destination device 16, video decoder 28 receives encoded video data 8. Video decoder 28 entropy decodes the received encoded video data 8, such as a coded block, according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 calculates a sum of the prediction block and the reconstructed residual block to produce a reconstructed video block for display. Additional details of an example decoding process performed by video decoder 28 are described below with respect to FIG. 5.

As described herein, Y may represent luminance, Cb and Cr may represent two different values of chrominance of a three-dimensional YCbCr color space (e.g., blue and red hues), and D may represent depth information. In some examples, each pixel location may actually define three pixel values for a three-dimensional color space and one pixel value for the depth of the pixel location. In other examples, there may be different numbers of luma components per chroma component. For example, there may be four luma components per chroma component. Additionally, the depth and texture components may have different resolutions. In such an example, there may not be a one-to-one relationship between texture view components (for example, luma components) and depth view components. The techniques of this disclosure, however, may refer to prediction with respect to one dimension for purposes of simplicity. To the extent that techniques are described with respect to pixel values in one dimension, similar techniques may be extended to the other dimensions. In particular, in accordance with one aspect of this disclosure, video encoder 22 and/or video decoder 28 may obtain a block of pixels, wherein the block of pixels includes texture view components and depth view components.

In some examples, video encoder 22 and video decoder 28 may use one or more interpolation filtering techniques during motion compensation. That is, video encoder 22 and/or video decoder 28 may apply an interpolation filter to filter support comprising sets of full integer pixel positions.

Video decoder 28 of destination device 16 receives one or more coded blocks as part of an encoded video bitstream along with additional information, including syntax elements relating to the texture view components. Video decoder 28 may render video data for 3D playback based on coded block 8 and syntax elements. In accordance with the techniques of this disclosure, and as discussed in greater detail below, syntax elements signaled for texture view components 4 may be used to predict syntax elements for depth view components 6. The syntax elements may be signaled in a slice header for texture view components 4. Corresponding syntax elements for depth view components 6 may be determined from the related syntax elements for texture view components 4.

Some syntax elements for the depth view components 6 may be signaled in a slice header for texture view components 4. Alternatively, some syntax elements for the texture view components 4 may be signaled in a slice header for depth view components 6. In one example, video encoder 22 of source device 12 may be configured to predict a syntax element for a slice header of a current view from a reference slice header, and code the current view based on the predicted syntax elements. In another example of the disclosure, video decoder 30 of destination device 16 may be configured to predict a syntax element for a slice header of a current view from a reference slice header, and code the current view based on the predicted syntax elements.

Techniques of this disclosure describe a slice header 3DV extension. The techniques may be applied to predict syntax elements for a depth view component from syntax elements stored in a slice header for co-located texture view components of the same view and of the same access unit. The access unit may be a network abstraction layer (NAL) unit that includes texture view components and corresponding depth view components. Prediction of the syntax elements may be controlled at the slice header level. Some syntax elements in a slice header of either the depth view component or the texture view component may be predicted from a reference slice header.

In one example, the reference slice header is either from the view component in the same view of the same access unit as the predicted syntax elements or is from the Advanced Video Coding (AVC) compatible base view texture of the same access unit. Alternatively, the reference slice header of a depth view component is either the slice header of the texture view component of the same view or the slice header of the depth view component of the first view in decoding order. A delta view order index ID may be signaled to indicate which view the slice header is predicted from, in the same access unit. In further examples, a flag may be signaled that indicates whether the reference slice header is from the depth view component or the texture view component. The specific view may also be signaled in a coded bitstream.

Other extensions to the slice header prediction may include arranging the syntax elements of a slice header in a different order than that used for slice header syntax elements in an AVC slice header. In other examples, a control flag in each slice header 3DV extension may indicate whether slice_type, num_ref_idx_l0_active_minus1, num_ref_idx_l1_active_minus1, and reference picture list modification are predicted. In some techniques, when prediction of the reference picture list modification is enabled, the reference picture list modification may be refined based on a newly introduced reference picture list exclusion or insertion syntax table.

In some examples, the above described flags or other indications are signaled only in the slice header 3DV extension. After a depth or texture view component is indicated, a slice ID of the slice of a given view component in an access unit may be further signaled. Furthermore, the slice ID may be signaled for each slice of each view component either the slice header or in a corresponding Network Abstraction Layer (NAL) unit header.

Figure 2:
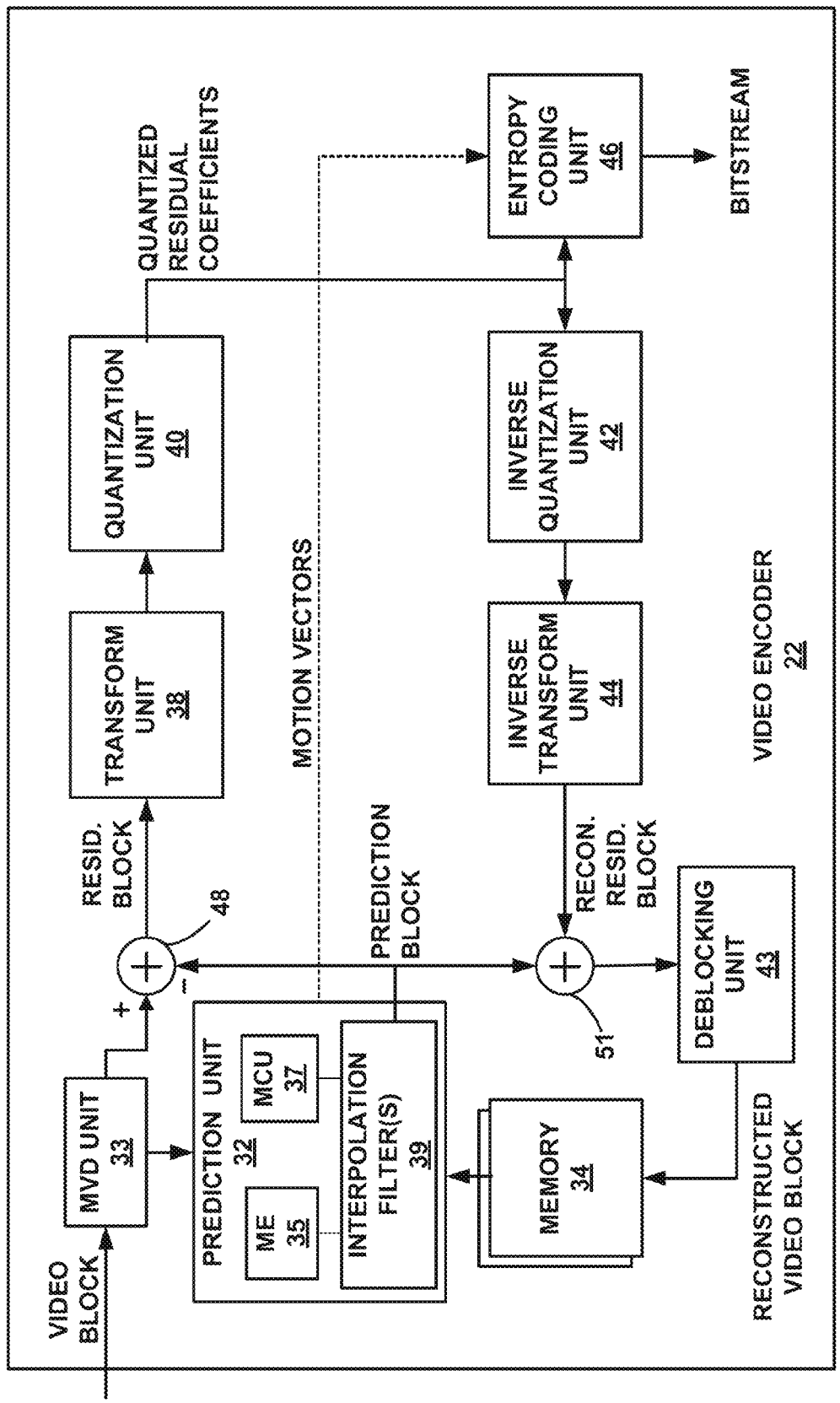
FIG. 2 is a block diagram illustrating an example of the video encoder of FIG. 1 in further detail, according to techniques of the present disclosure.

FIG. 2 is a block diagram illustrating an example of the video encoder 22 of FIG. 1 in further detail. Video encoder 22 encodes block units that signal syntax elements for texture view components that may be used to predict syntax elements for depth view components, consistent with the techniques of this disclosure. Video encoder 22 is one example of a specialized video computer device or apparatus referred to herein as a "coder." As shown in FIG. 2, video encoder 22 corresponds to video encoder 22 of source device 12. However, in other examples, video encoder 22 may correspond to a different device. In further examples, other units (such as, for example, other encoder/decoder (CODECS)) can also perform similar techniques to those performed by video encoder 22.

Video encoder 22 may perform at least one of intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial-based compression mode. Inter-modes such as a prediction (P-mode) or a bi-directional (B-mode) may refer to the temporal based compression modes. The techniques of this disclosure apply during inter-coding and intra-coding. However, for simplicity and ease of illustration, intra-coding units such as a spatial prediction unit are not illustrated in FIG. 2.

As shown in FIG. 2, video encoder 22 receives a video block within a video frame to be encoded. In one example, video encoder 22 receives texture view components 4 and depth view components 6. In another example, video encoder receives view 2 from video source 20.

In the example of FIG. 2, video encoder 22 includes a prediction processing unit 32 prediction coding unit (MCU), multi-view video plus depth (MVD) unit 33, memory 34, a first adder 48, a transform processing unit 38, a quantization unit 40, and an entropy coding unit 46. For video block reconstruction, video encoder 22 also includes an inverse quantization unit 42, an inverse transform processing unit 44, a second adder 51, and a deblocking unit 43. Deblocking unit 43 is a deblocking filter that filters block boundaries to remove blockiness artifacts from reconstructed video. If included in video encoder 22, deblocking unit 43 would typically filter the output of second adder 51. Deblocking unit 43 may determine deblocking information for the one or more texture view components. Deblocking unit 43 may also determine deblocking information for the depth map component. In some examples, the deblocking information for the one or more texture components may be different than the deblocking information for the depth map component. In one example, as shown in FIG. 2, transform processing unit 38 represents a functional block, as opposed to a "TU" in terms of HEVC.

Multi-view video plus depth (MVD) unit 33 receives one or more video blocks (labeled "VIDEO BLOCK" in FIG. 2) comprising texture components and depth information, such as texture view components 4 and depth view components 6. MVD unit 33 provides functionality to video encoder 22 to encode depth components in a block unit. The MVD unit 33 sends the texture view components and depth view components, either combined or separately, to prediction processing unit 32 in a format that enables prediction processing unit 32 to process depth information. MVD unit 33 may also signal to transform processing unit 38 that the depth view components is included with the video block. In other examples, each unit of video encoder 22, such as prediction processing unit 32, transform processing unit 38, quantization unit 40, entropy coding unit 46, etc., comprises functionality to process depth information in addition to texture view components.

In general, video encoder 22 encodes the depth information in a manner similar to chrominance information, in that motion compensation unit 37 is configured to reuse motion vectors calculated for a luminance component of a block when calculating a predicted value for a depth component of the same block. Similarly, an intra-prediction unit of video encoder 22 may be configured to use an intra-prediction mode selected for the luminance component (that is, based on analysis of the luminance component) when encoding the depth view component using intra-prediction.

Prediction processing unit 32 includes a motion estimation (ME) unit 35 and a motion compensation (MC) unit 37. Prediction processing unit 32 predicts depth information for pixel locations as well as for texture components. One or more interpolation filters 39 (referred to herein as "filter 39") may be included in prediction processing unit 32 and may be invoked by one or both of ME unit 35 and MC unit 37 to perform interpolation as part of motion estimation and/or motion compensation. Interpolation filter 39 may actually represent a plurality of different filters to facilitate numerous different types of interpolation and interpolation-type filtering. Thus, prediction processing unit 32 may include a plurality of interpolation or interpolation-like filters.

During the encoding process, video encoder 22 receives a video block to be coded (labeled "VIDEO BLOCK" in FIG. 2), and prediction processing unit 32 performs inter-prediction coding to generate a prediction block (labeled "PREDICTION BLOCK" in FIG. 2). The prediction block includes both texture view components and depth view information. Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The motion vector may have full-integer or sub-integer pixel precision. For example, both a horizontal component and a vertical component of the motion vector may have respective full integer components and sub-integer components. The reference frame (or portion of the frame) may be temporally located prior to or after the video frame (or portion of the video frame) to which the current video block belongs. Motion compensation is typically considered the process of fetching or generating the prediction block from memory 34, which may include interpolating or otherwise generating the predictive data based on the motion vector determined by motion estimation.

ME unit 35 calculates at least one motion vector for the video block to be coded by comparing the video block to reference blocks of one or more reference frames (e.g., a previous and/or subsequent frame). Data for the reference frames may be stored in memory 34. ME unit 35 may perform motion estimation with fractional pixel precision, sometimes referred to as fractional pixel, fractional pel, sub-integer, or sub-pixel motion estimation. In fractional pixel motion estimation, ME unit 35 calculates a motion vector that indicates displacement to a location other than an integer pixel location. Thus, the motion vector may have fractional pixel precision, e.g., one-half-pixel precision, one-quarter-pixel precision, one-eighth pixel precision, or other fractional pixel precisions. In this manner, fractional pixel motion estimation allows prediction processing unit 32 to estimate motion with higher precision than integer-pixel (or full-pixel) locations, and thus, prediction processing unit 32 generates a more accurate prediction block. Fractional pixel motion estimation allows prediction processing unit 32 to predict depth information at a first resolution and to predict the texture components at a second resolution. For example, the texture components are predicted to a full-pixel precision while the depth information is predicted to one-half-pixel precision. In other examples, other resolutions of the motion vector may be used for depth information and texture components.

ME unit 35 may invoke one or more filters 39 for any necessary interpolations during the motion estimation process. In some examples, memory 34 may store interpolated values for sub-integer pixels, which may be calculated by, e.g., adder 51 using filters 39. For example, adder 51 may apply filters 39 to reconstructed blocks that are to be stored in memory 34.

Once prediction processing unit 32 has generated the prediction block, video encoder 22 forms a residual video block (labeled "RESID. BLOCK" in FIG. 2) by subtracting the prediction block from the original video block being coded. This subtraction may occur between texture components in the original video block and texture components in the prediction block, as well as for depth information in the original video block or depth map from depth information in the prediction block. Adder 48 represents the component or components that perform this subtraction operation.

Transform processing unit 38 applies a transform, such as a discrete cosine transform (DCT) or a conceptually similar transform, to the residual block, producing a video block comprising residual transform block coefficients. It should be understood that transform processing unit 38 represents the component of video encoder 22 that applies a transform to residual coefficients of a block of video data, in contrast to a TU of a CU as defined by HEVC. Transform processing unit 38, for example, may perform other transforms, such as those defined by the H.264 standard, which are conceptually similar to DCT. Such transforms include, for example, directional transforms (such as Karhunen-Loeve theorem transforms), wavelet transforms, integer transforms, sub-band transforms, or other types of transforms. In any case, transform processing unit 38 applies the transform to the residual block, producing a block of residual transform coefficients. Transform processing unit 38 may apply the same type of transform to both the texture components and the depth information in corresponding residual blocks. There will be separate residual blocks for each texture and depth component. The transform converts the residual information from a pixel domain to a frequency domain.

Quantization unit 40 quantizes the residual transform coefficients to further reduce bit rate. The quantization process may reduce the bit depth associated with some or all of the coefficients. Quantization unit 40 may quantize a depth image coding residue. Following quantization, entropy coding unit 46 entropy codes the quantized transform coefficients. For example, entropy coding unit 46 may perform CAVLC, CABAC, or another entropy coding methodology.

Entropy coding unit 46 may also code one or more motion vectors and support information obtained from prediction processing unit 32 or other component of video encoder 22, such as quantization unit 40. The one or more prediction syntax elements may include a coding mode, data for one or more motion vectors (e.g., horizontal and vertical components, reference list identifiers, list indexes, and/or motion vector resolution signaling information), an indication of a used interpolation technique, a set of filter coefficients, an indication of the relative resolution of the depth image to the resolution of the luma component, a quantization matrix for the depth image coding residue, deblocking information for the depth image, or other information associated with the generation of the prediction block. These prediction syntax elements may be included in the sequence level or in the picture level.

The one or more syntax elements may also include a quantization parameter (QP) difference between the luma component and the depth component. The QP difference may be signaled at the slice level and may be included in a slice header for the texture view components. Other syntax elements may also be signaled at a coded block unit level, including a coded block pattern for the depth view component, a delta QP for the depth view component, a motion vector difference, or other information associated with the generation of the prediction block. The motion vector difference may be signaled as a delta value between a target motion vector and a motion vector of the texture components, or as a delta value between the target motion vector (that is, the motion vector of the block being coded) and a predictor from neighboring motion vectors for the block (e.g., a PU of a CU). Following the entropy coding by entropy coding unit 46, the encoded video and syntax elements may be transmitted to another device or archived (for example, in memory 34) for later transmission or retrieval.

Inverse quantization unit 42 and inverse transform processing unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block sent to transform processing unit 38. The reconstructed residual block may differ from the residual block generated by adder 48 due to loss of detail caused by the quantization and inverse quantization operations. Adder 51 adds the reconstructed residual block to the motion compensated prediction block produced by prediction processing unit 32 to produce a reconstructed video block for storage in memory 34. The reconstructed video block may be used by prediction processing unit 32 as a reference block that may be used to subsequently code a block unit in a subsequent video frame or subsequent coded unit.

In this manner, video encoder 22 represents an example of a video encoder configured to receive a coded block unit comprising a view component indicative of a view of an image, wherein the view component comprises one or more texture view components and a depth view component, generate a texture slice header for the one or more texture view components including texture syntax elements, wherein depth syntax elements for the depth view component can be determined from the texture syntax elements in the texture slice header.

In some cases, information regarding coding of the texture view components and depth view components are indicated as one or more syntax elements for inclusion in the coded bitstream. In some examples, a depth slice header comprises syntax elements including at least one of the slice address location of the starting macroblock, the slice type, the picture parameter set (PPS) to be used, the delta QP between the initial QP of the slice and the QP signaled in the PPS, the order of the reference pictures (represented as frame_num), and a display order of the current picture (POC). The depth slice header may also comprise at least one of a reference picture list construction and related syntax elements, a memory management control operation and related syntax elements, and a weighted prediction and related syntax elements.

Figure 3:
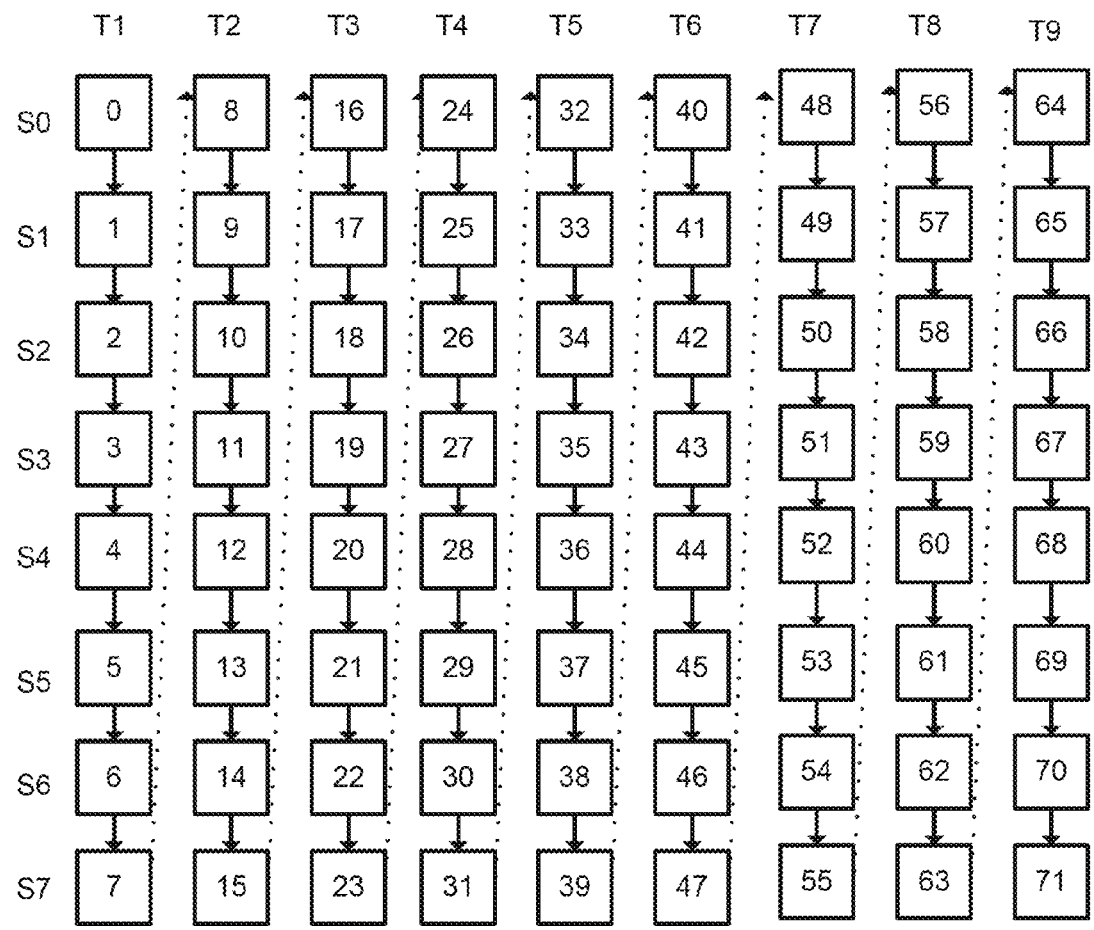
FIG. 3 is a conceptual diagram illustrating an example multiview decoding order, according to techniques of the present disclosure.

FIG. 3 is a conceptual diagram illustrating an example multiview decoding order, according to techniques of the present disclosure. A typical MVC decoding order (i.e. bitstream order) is shown in FIG. 3. The decoding order arrangement is referred to as time-first coding. Each access unit is defined to contain the coded pictures of all the views for one output time instance. Note that the decoding order of access units may not be identical to the output or display order.

Figure 4:
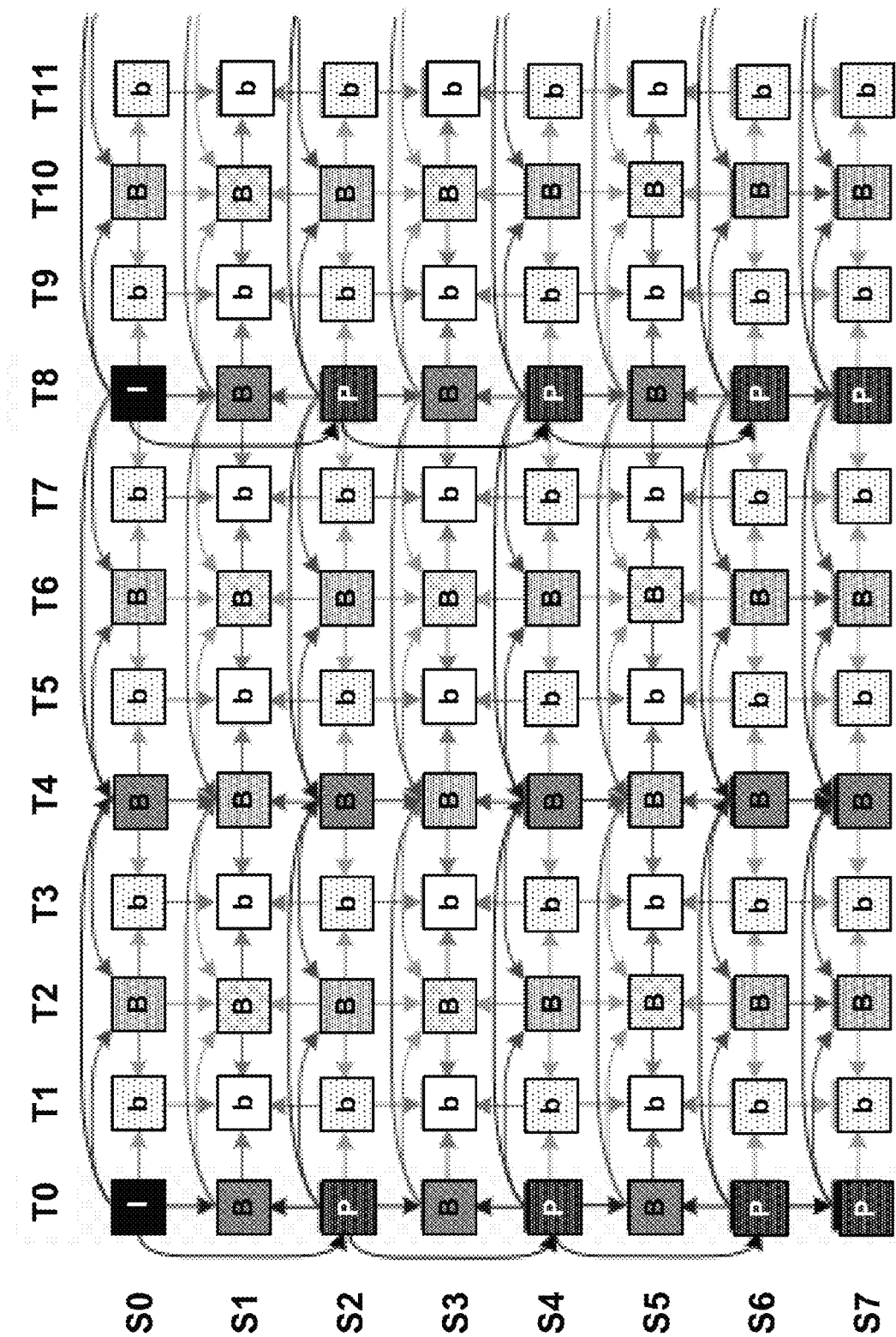
FIG. 4 is a diagram of one example of a MVC prediction structure for multi-view video coding, according to techniques of the present disclosure.

FIG. 4 is a diagram of one example of a MVC (MVC) prediction structure for multi-view video coding. MVC is an extension of H.264/AVC. FIG. 4 illustrates a typical MVC prediction structure (including both inter-picture prediction within each view and inter-view prediction) for multi-view video coding. The MVC prediction structure includes both inter-picture prediction within each view and inter-view prediction. In FIG. 4, predictions are indicated by arrows, where the pointed-to object using the pointed-from object for prediction reference. The MVC prediction structure of FIG. 4 may be used in conjunction with a time-first decoding order arrangement. In a time-first decoding order, each access unit may be defined to contain coded pictures of all the views for one output time instance. The decoding order of access units may not be identical to the output or display order.

In MVC, the inter-view prediction is supported by disparity motion compensation, which uses the syntax of the H.264/AVC motion compensation, but allows a picture in a different view to be put as a reference picture. Coding of two views could be supported also by MVC. An MVC encoder may take more than two views as a 3D video input and an MVC decoder can decode multi-view representation. A renderer with an MVC decoder can decode 3D video content with multiple views.

Pictures in the same access unit (i.e., with the same time instance) can be inter-view predicted in MVC. When coding a picture in one of the non-base views, a picture may be added into a reference picture list if it is in a different view but with a same time instance. An inter-view prediction reference picture may be put in any position of a reference picture list, just like any inter prediction reference picture.

As shown in FIG. 4, a view component can use the view components in other views for reference. In MVC, inter-view prediction may be realized as if the view component in another view is an inter prediction reference. The potential inter-view references may be signaled in the Sequence Parameter Set (SPS) MVC extension. The potential inter-view references may be modified by the reference picture list construction process, which enables flexible ordering of the inter prediction or inter-view prediction references. Table 1 below shows an example SPS MVC extension.

TABLE 1

Example SPS MVC extension

| seq_parameter_set_mvc_extension( ) { | C | Descriptor |
|---|---|---|
| num_views_minus1 | 0 | ue(v) |
| for( i = 0; i <= num_views_minus1; i++ ) | | |
| view_id[ i ] | 0 | ue(v) |
| for( i = 1; i <= num_views_minus1; i++ ) { | | |
| num_anchor_refs_l0[ i ] | 0 | ue(v) |
| for( j = 0; j < num_anchor_refs_l0[ i ]; j++ ) | | |
| anchor_ref_l0[ i ][ j ] | 0 | ue(v) |
| num_anchor_refs_l1[ i ] | 0 | ue(v) |
| for( j = 0; j < num_anchor_refs_l1[ i ]; j++ ) | | |
| anchor_ref_l1[ i ][ j ] | 0 | ue(v) |
| } | | |
| for( i = 1; i <= num_views_minus1; i++ ) { | | |
| num_non_anchor_refs_l0[ i ] | 0 | ue(v) |
| for( j = 0; j < num_non_anchor_refs_l0[ i ]; j++ ) | | |
| non_anchor_ref_l0[ i ][ j ] | 0 | ue(v) |
| num_non_anchor_refs_l1[ i ] | 0 | ue(v) |
| for( j = 0; j < num_non_anchor_refs_l1[ i ]; j++ ) | | |
| non_anchor_ref_l1[ i ][ j ] | 0 | ue(v) |
| } | | |
| num_level_values_signalled_minus1 | 0 | ue(v) |
| for( i = 0; i <= num_level_values_signalled_minus1; i++ ) { | | |
| level_idc[ i ] | 0 | u(8) |
| num_applicable_ops_minus1[ i ] | 0 | ue(v) |
| for( j = 0; j <= num_applicable_ops_minus1[ i ]; j++ ) { | | |
| applicable_op_temporal_id[ i ][ j ] | 0 | u(3) |
| applicable_op_num_target_views_minus1[ i ][ j ] | 0 | ue(v) |
| for( k = 0; k <= applicable_op_num_target_views_minus1[ i ][ j ]; k++ ) | | |
| applicable_op_target_view_id[ i ][ j ][ k ] | 0 | ue(v) |
| applicable_op_num_views_minus1[ i ][ j ] | 0 | ue(v) |
| } | | |
| } | | |
| } | | |

In contrast, in HEVC, the slice header follows a similar design principle as that in H.264/AVC. Conceptually, both HEVC and H.264/AVC include a Video Coding Layer (VCL) and a Network Abstraction Layer (NAL). The VCL includes all low-level signal processing, including block partitioning, inter and intra prediction, transform-based coding, entropy coding, loop filtering, and the like. The NAL encapsulates coded data and associated information into NAL units, a format that is friendly to video transmission and applications systems. Additionally, an HEVC slice header may contain an adaptive loop filter (ALF) parameter syntax in the current HEVC specification. In some examples, the depth slice header comprises one or more adaptive loop filter parameters.

Similar to H.264/AVC, an HEVC bitstream includes a number of access units, each access unit including coded data associated with a picture that has a distinct capturing or presentation time.

Each access unit is divided into NAL units, including one or more VCL NAL units (i.e., coded slice NAL units) and zero or more non-VCL NAL units, e.g., parameter set NAL units or Supplemental Enhancement Information (SEI) NAL units. Each NAL unit includes a NAL unit header and a NAL unit payload. Information in the NAL unit header can be accessed by media gateways, also known as Media Aware Network Elements (MANEs), for intelligent, media-aware operations on the stream, such as stream adaptation.

A difference of HEVC compared to H.264/AVC is the coding structure within a picture. In HEVC, each picture is divided into treeblocks of up to 64×64 luma samples. Treeblocks can be recursively split into smaller Coding Units (CUs) using a generic quad-tree segmentation structure. CUs can be further split into Prediction Units (PUs) and Transform Units (TUs). Prediction units (PUs) may be used for intra- and inter-prediction. Transform Units may be defined for transform and quantization. HEVC includes integer transforms for a number of TU sizes.

Predictively coded pictures can include uni-predicted and bi-predicted slices. The flexibility in creating picture coding structures is roughly comparable to H.264/AVC. The VCL in an HEVC encoder generates, and in an HEVC decoder consumes, syntax structures designed to be adaptable to Maximum Transmission Unit (MTU) sizes commonly found in IP networks, irrespective of the size of a coded picture. Picture segmentation may be achieved through slices. A concept of "fine granularity slices" (FGS) is included that allows creation of slice boundaries within a treeblock.

As in H.264/AVC, in-loop deblocking filtering may be applied to the reconstructed picture. HEVC also includes two in-loop filters that may be applied after the deblocking filtering: Sample Adaptive Offset (SAO) and Adaptive Loop Filter (ALF).

Another difference of HEVC compared to H.264/AVC is the availability of VCL-based coding tools that are designed to enable processing on high-level parallel architectures. Regular slices, as in both HEVC and H.264/AVC, may be used for parallel-processing purpose. Besides regular slices, three new parallel processing tools are available, namely entropy slices, tiles, and wavefront parallel processing.

The currently developing high efficiency video coding (HEVC) standard also uses slice headers. In HEVC, the slice header follows the same design principle as that in H.264/AVC. The slice header in HEVC also contains adaptive loop filter (ALF) parameter syntax. However, it is debatable whether the adaptive loop filter parameters should be put into the slice header.

The current construction of the slice header in H.264/MVC and HEVC presents some drawbacks. For example, some syntax elements are not lightweight, but allowing prediction techniques to be used for all "non-lightweight" syntax elements may not be beneficial. For example, prediction of the entire reference picture list modification syntax table may not be beneficial. In addition, slice header prediction among the same view components might not be always produce desirable efficiency.

In the context of the techniques of this disclosure, prediction of syntax for slice header syntax elements may entail copying or inserting syntax elements from another slice header (e.g., a reference slice header) for use by a current slice header. The syntax elements to be copied or inserted may be designated by a flag or an index. In addition, a flag or index may designate a reference slice header.

In a 3DV codec, a view component of each view in a specific time instance may include a texture view component and a depth view component. A slice structure may be used for error resilience purposes. However, a depth view component might only be meaningful when the corresponding texture view component is correctly received. Including all the syntax elements for the depth view component may cause a slice header for the NAL unit of the depth view component to be relatively large. The size of the depth slice header may be reduced by predicting some syntax elements from syntax elements in the texture slice header for the texture view components. In addition, the size of a slice header for a view may be reduced by predicting some syntax elements from syntax elements of another view.

A bitstream may be used to transfer multiview video plus depth block units and syntax elements between, for example, source device 12 and destination device 16 of FIG. 1. The bitstream may comply with the coding standard ITU H.264/AVC, and in particular, follows a multi-view video coding (MVC) bitstream structure. That is, in some examples, the bitstream conforms to the MVC extension of H.264/AVC. In other examples, the bitstream conforms to a multiview extension of HEVC or multiview extension of another standard. In still other examples, other coding standards are used.

A typical MVC bitstream order (decoding order) arrangement is a time-first coding. Each access unit is defined to contain the coded pictures of all the views for one output time instance. The decoding order of access units may or may not be identical to the output or display order. Typically, MVC prediction may include both inter-picture prediction within each view and inter-view prediction. In MVC, the inter-view prediction may be supported by disparity motion compensation, which uses the syntax of the H.264/AVC motion compensation, but allows a picture in a different view to be used as a reference picture.

Coding of two views is supported by MVC. One of the advantages of MVC is that an MVC encoder could take more than two views as a 3D video input and an MVC decoder can decode the two views into a multi-view representation. Thus, a renderer with an MVC decoder may treat 3D video content as having multiple views. Previously, MVC did not process depth map input, similar to H.264/AVC with supplemental enhancement information (SEI) messages (stereo information or spatial interleaving pictures).

In the H.264/AVC standard, Network Abstraction Layer (NAL) units are defined for a "network-friendly" video representation addressing applications such as video telephony, storage, or streaming video. NAL units can be categorized to Video Coding Layer (VCL) NAL units and non-VCL NAL units. VCL units may contain a core compression engine and comprise block, macroblock (MB), and slice levels. Other NAL units are non-VCL NAL units.

In a 2D video encoding example, each NAL unit contains a one byte NAL unit header and a payload of varying size. Five bits are used to specify the NAL unit type. Three bits are used for nal_ref_idc, which indicates how important the NAL unit is in terms of being referenced by other pictures (NAL units). For example, setting nal_ref_idc equal to 0 means that the NAL unit is not used for inter prediction. As H.264/AVC is expanded to include 3D video encoding, such as the scalable video coding (SVC) standard, the NAL header may be similar to that of the 2D scenario. For example, one or more bits in the NAL unit header are used to identify that the NAL unit is a four-component NAL unit.

NAL unit headers may also be used for MVC NAL units. However, in MVC, the NAL unit header structure may be retained except for prefix NAL units and MVC coded slice NAL units. MVC coded slice NAL units may comprise a four-byte header and the NAL unit payload, which may include a block unit such as coded block 8 of FIG. 1. Syntax elements in MVC NAL unit header may include priority_id, temporal_id, anchor_pic_flag, view_id, non_idr_flag and inter_view_flag. In other examples, other syntax elements are included in an MVC NAL unit header.

The syntax element anchor_pic_flag may indicate whether a picture is an anchor picture or non-anchor picture. Anchor pictures and all the pictures succeeding it in the output order (i.e., display order) can be correctly decoded without decoding of previous pictures in the decoding order (i.e., bitstream order) and thus can be used as random access points. Anchor pictures and non-anchor pictures can have different dependencies, both of which may be signaled in the sequence parameter set.

The bitstream structure defined in MVC may be characterized by two syntax elements: view_id and temporal_id. The syntax element view_id may indicate the identifier of each view. This identifier in NAL unit header enables easy identification of NAL units at the decoder and quick access of the decoded views for display. The syntax element temporal_id may indicate the temporal scalability hierarchy or, indirectly, the frame rate. For example, an operation point including NAL units with a smaller maximum temporal_id value may have a lower frame rate than an operation point with a larger maximum temporal_id value. Coded pictures with a higher temporal_id value typically depend on the coded pictures with lower temporal_id values within a view, but may not depend on any coded picture with a higher temporal_id.

The syntax elements view_id and temporal_id in the NAL unit header may be used for both bitstream extraction and adaptation. The syntax element priority_id may be mainly used for the simple one-path bitstream adaptation process. The syntax element inter_view_flag may indicate whether this NAL unit will be used for inter-view predicting another NAL unit in a different view.

MVC may also employ sequence parameter sets (SPSs) and include an SPS MVC extension. Parameter sets are used for signaling in H.264/AVC. Sequence parameter sets comprise sequence-level header information. Picture parameter sets (PPSs) comprise the infrequently changing picture-level header information. With parameter sets, this infrequently changing information is not always repeated for each sequence or picture, hence coding efficiency is improved. Furthermore, the use of parameter sets enables out-of-band transmission of the header information, avoiding the need of redundant transmissions for error resilience. In some examples of out-of-band transmission, parameter set NAL units are transmitted on a different channel than the other NAL units. In MVC, a view dependency may be signaled in the SPS MVC extension. All inter-view prediction may be done within the scope specified by the SPS MVC extension.

In some previous 3D video encoding techniques, content is coded in such a way that the color components, e.g., in the YCbCr color space, are coded in one or more NAL units while the depth image is coded in one or more separate NAL units. However, when no single NAL unit contains the coded samples of texture and depth images of an access unit, several problems may occur. For example, in a 3D video decoder, it is expected that after decoding both the texture and depth image of each frame, view rendering based on the depth map and texture is activated to generate the virtual views. If the NAL unit of the depth image and the NAL unit of the texture for an access unit are coded in a sequential manner, view rendering may not begin until the entire access unit is decoded. This may lead to an increase in the time it takes for the 3D video to be rendered.

Furthermore, the texture image and the associated depth map image may share some information in various levels in the codec, e.g., sequence level, picture level, slice level, and block level. Coding this information into two NAL units may create an extra implementation burden when sharing or predicting the information. Thus, the encoder may have to perform motion estimation for a frame twice, once for the texture and again for the depth map. Similarly, the decoder may need to perform motion compensation twice for a frame.

As described herein, techniques are added to existing standards, such as MVC, in order to support 3D video. Multi-view video plus depth (MVD) may be added to MVC for 3D video processing. The 3D video encoding techniques may include more flexibility and extensibility to existing video standards, for example, for changing the view angle smoothly or adjusting the convergence or depth perception backward or forward, which may be based on the specifications of the devices or user preferences, for example. The coding standards may also be expanded to utilize depth maps for the generation of virtual views in 3D video.

The following tables show example syntax elements for implementing the techniques of this disclosure.

TABLE 2

Slice header 3DV extension

| slice_header_3DV_extension( ) { | C | Descriptor |
|---|---|---|
| if (pred_slice_header_depth_idc = = 0) | | |
|   slice_header( ) | | |
| else { | | |
|   if (pred_slice_header_depth_idc = = 2) | | |
|     first_mb_in_slice | 2 | ue(v) |
|   pic_parameter_set_id | 2 | ue(v) |
|   ref_pic_list_inherit_flag | 2 | u(1) |
|   ref_pic_inside_view_or_base_view_flag | 2 | u(1) |
|   if ( !ref_pic_list_inherit_flag ) { | | |
|     if( slice_type = = P \|\| slice_type = = SP \|\| slice_type = = B ) { | | |
|       num_ref_idx_active_override_flag | 2 | u(1) |
|       if( num_ref_idx_active_override_flag ) { | | |
|         num_ref_idx_l0_active_minus1 | 2 | ue(v) |
|         if( slice_type = = B ) | | |
|           num_ref_idx_l1_active_minus1 | 2 | ue(v) |
|       } | | |
|     } | | |
|     if( slice_type % 5 != 2 && slice_type % 5 != 4 ) | | |
|       ref_pic_list_exclusion_or_insertion(0, abs(NumRef0Delta) ) | | |
|     if( slice_type % 5 = = 1 ) | | |
|       ref_pic_list_exclusion_or_insertion(1, abs(NumRef1Delta) ) | | |
|     ref_pic_list_3vc_modification( ) | 2 | |
|   } | | |
|   slice_qp_delta | 2 | se(v) |
| } | | |
| } | | |

The syntax element ref_pic_list_inherit_flag equal to 1 indicates that the reference picture list construction related syntax elements are the same as those in the reference slice header. The syntax element ref_pic_list_inherit_flag equal to 0 indicates that the reference picture list construction related syntax elements may not be the same as those in the reference slice header and may be further present in this slice header.

The syntax element ref_pic_inside_view_or_base_view_flag equal to 1 indicates that the reference slice header is the slice header from the texture or depth view component that has already been present in the current view component of the same access unit. The ref_pic_inside_view_or_base_view_flag equal to 0 indicates that the reference slice header is the slice header of the AVC compatible base view (texture).

As another example, the ref_pic_inside_view_or_base_view_flag equal to 1 may indicate that the reference slice header is the slice header of the depth view component of the base view. When ref_pic_inside_view_or_base_view_flag is equal to 0, an additional flag is introduced to signal whether the reference slice header is the slice header of the texture or depth of the base view.

The syntax element NumRefxDelta is derived to be equal to the difference between the value of num_ref_idx_lx_active_minus1 signaled in the current slice header and the value of num_ref_idx_lx_active_minus1 in the reference slice header.

TABLE 3

Reference picture list exclusion or insertion syntax element

| ref_pic_list_exclusion_or_insertion (x, N) { | C | Descriptor |
|---|---|---|
| ref_pic_list_insetion_lx | 2 | u(1) |
| if (!ref_pic_list_insetion_lx) { | | |
| ref_pic_list_exclusing_lx | 2 | u(1) |
| excluding_from_begining_or_ending_lx | 2 | u(1) |
| else { | | |
| inserting_from_begining_or_ending_lx | 2 | u(1) |
| for (i =0 ; i < N ; i ++ ) { | | |
| modification_of_pic_nums_idc | 2 | ue(v) |
| if( modification_of_pic_nums_idc = = 0 \|\| | | |
| modification_of_pic_nums_idc = = 1 ) | | |
| abs_diff_pic_num_minus1 | 2 | ue(v) |
| else if( modification_of_pic_nums_idc = = 2 ) | | |
| long_term_pic_num | 2 | ue(v) |
| else if ( modification_of_pic_nums_idc = = 4 \|\| | | |
| modification_of_pic_nums_idc = = 5 ) | | |
| abs_diff_view_idx_minus1 | 2 | ue(v) |
| } | | |
| } | | |
| } | | |
| } | | |

The syntax element ref_pic_list_insertion_lx equal to 1 indicates that reference pictures of RefPicListx are added to the RefPicListx constructed following the syntax elements of the reference slice header. The syntax element ref_pic_list_insertion_lx equal to 0 indicate that reference pictures of RefPicListx are not added to the RefPicListx constructed following the syntax elements of the reference slice header.

The syntax element excluding_from_begining_or_ending_lx equal to 1 indicates that the reference pictures of RefPicListx are excluded from the RefPicListx constructed following the syntax elements of the reference slice header. The syntax element excluding_from_begining_or_ending_lx equal to 0 indicates that reference picture modification syntax may be signaled for RefPicListx. Thus, the reference picture list construction for RefPicListx is based on the signalled syntax in this slice header. When not present, this flag is inferred to be equal to 0.

The syntax element NewRPLRFlagx is set as follows:

if (ref_pic_list_inserion_lx) NewRPLRFlagx=false;

else if (ref_pic_list_exclusing_lx) NewRPLRFlagx=false;

else NewRPLRFlagx=true

The decoding process for reference picture list insertion is similar to reference picture list modification (RPLM), with the starting picNumber set as follows. If the reference pictures are inserted at the beginning of a list (generated by the syntax in the reference slice header), the picNumber is set the same as the starting number of a new RPLM. If the reference pictures are inserted at the end of a list, the picNumber is set to the number of the last reordered frame based on the RPLM.

TABLE 4

Reference Picture List Modification Syntax Elements

| ref_pic_list_3vc_modification( ) { | C | Descriptor |
|---|---|---|
| if( slice_type % 5 != 2 && slice_type % 5 != 4 | | |
| && ! NewRPLRFlag0) { | | |
| ref_pic_list_modification_flag_l0 | 2 | u(1) |
| if( ref_pic_list_modification_flag_l0 ) | | |
| do { | | |
| modification_of_pic_nums_idc | 2 | ue(v) |
| if( modification_of_pic_nums_idc = = 0 \|\| | | |
| modification_of_pic_nums_idc = = 1 ) | | |
| abs_diff_pic_num_minus1 | 2 | ue(v) |
| else if( modification_of_pic_nums_idc = = 2 ) | | |
| long_term_pic_num | 2 | ue(v) |
| else if ( modification_of_pic_nums_idc = = 4 \|\| | | |
| modification_of_pic_nums_idc = = 5 ) | | |
| abs_diff_view_idx_minus1 | 2 | ue(v) |
| } while( modification_of_pic_nums_idc != 3 ) | | |
| } | | |
| if( slice_type % 5 = = 1 && ! NewRPLRFlag1)) { | | |
| ref_pic_list_modification_flag_l1 | 2 | u(1) |
| if( ref_pic_list_modification_flag_l1 ) | | |
| do { | | |
| modification_of_pic_nums_idc | 2 | ue(v) |
| if( modification_of_pic_nums_idc = = 0 \|\| | | |
| modification_of_pic_nums_idc = = 1 ) | | |
| abs_diff_pic_num_minus1 | 2 | ue(v) |
| else if( modification_of_pic_nums_idc = = 2 ) | | |
| long_term_pic_num | 2 | ue(v) |
| else if ( modification_of_pic_nums_idc = = 4 \|\| | | |
| modification_of_pic_nums_idc = = 5 ) | | |
| abs_diff_view_idx_minus1 | 2 | ue(v) |
| } while( modification_of_pic_nums_idc != 3 ) | | |
| } | | |
| } | | |

Table 5 illustrates another example slice header 3DV extension.

TABLE 5

Slice Header 3DV Extension

| slice_header( ) { | C | Descriptor |
|---|---|---|
| first_mb_in_slice | 2 | ue(v) |
| slice_type | 2 | ue(v) |
| pic_parameter_set_id | 2 | ue(v) |
| slice_id | 2 | ue(v) |
| if(slice_header_prediction_idc != 0 ) { | | |
| ref_pic_list_inherit_flag | 2 | u(1) |
| delta_view_idx | 2 | ue(v) |
| if (delta_view_idx >0 ) | | |
| from_texture_depth_flag | 2 | u(1) |
| slice_id_in_ref_view_component | 2 | ue(v) |
| if ( ! ref_pic_list_inherit_flag ) { | | |
| if( slice_type = = P \|\| slice_type = = SP | | |
| \|\| slice_type = = B ) { | | |
| num_ref_idx_active_override_flag | 2 | u(1) |
| if( num_ref_idx_active_override_flag ) { | | |
| num_ref_idx_l0_active_minus1 | 2 | ue(v) |
| if( slice_type = = B ) | | |
| num_ref_idx_l1_active_minus1 | 2 | ue(v) |
| } | | |
| } | | |
| ref_pic_list_mvc_modification( ) | 2 | |
| } | | |
| slice_qp_delta | 2 | se(v) |
| } else { | | |
| if( separate_colour_plane_flag = = 1 ) | | |
| colour_plane_id | 2 | u(2) |
| frame_num | 2 | u(v) |
| if( !frame_mbs_only_flag ) { | | |
| field_pic_flag | 2 | u(1) |

TABLE 5-continued

Slice Header 3DV Extension

| slice_header( ) { | C | Descriptor |
|---|---|---|
|     if( field_pic_flag ) | | |
|         bottom_field_flag | 2 | u(1) |
|     } | | |
|     if( IdrPicFlag ) | | |
|         idr_pic_id | 2 | ue(v) |
|     if( pic_order_cnt_type = = 0 ) { | | |
|         pic_order_cnt_lsb | 2 | u(v) |
|         if( bottom_field_pic_order_in_frame_present_flag && !field_pic_flag ) | | |
|             delta_pic_order_cnt_bottom | 2 | se(v) |
|     } | | |
|     if( pic_order_cnt_type = = 1 && !delta_pic_order_always_zero_flag ) { | | |
|         delta_pic_order_cnt[ 0 ] | 2 | se(v) |
|         if( bottom_field_pic_order_in_frame_present_flag && !field_pic_flag ) | | |
|             delta_pic_order_cnt[ 1 ] | 2 | se(v) |
|     } | | |
|     if( redundant_pic_cnt_present_flag ) | | |
|         redundant_pic_cnt | 2 | ue(v) |
|     if( slice_type = = B ) | | |
|         direct_spatial_mv_pred_flag | 2 | u(1) |
|     if( slice_type = = P \|\| slice_type = = SP \|\| slice_type = = B ) { | | |
|         num_ref_idx_active_override_flag | 2 | u(1) |
|         if( num_ref_idx_active_override_flag ) { | | |
|             num_ref_idx_l0_active_minus1 | 2 | ue(v) |
|             if( slice_type = = B ) | | |
|                 num_ref_idx_l1_active_minus1 | 2 | ue(v) |
|         } | | |
|     } | | |
|     if( nal_unit_type = = 20 \|\| ( nal_unit_type = = 21 && DepthFlag ) ) | | |
|         ref_pic_list_mvc_modification( ) /* specified in Annex H */ | 2 | |
|     else if( nal_unit_type = = 21 && DepthFlag = = 0 ) | | |
|         /* it has not been decided yet, which reference picture list modification syntax and decoding process is used */ | | |
|     else | | |
|         ref_pic_list_modification( ) | 2 | |
|     if( ( weighted_pred_flag && ( slice_type = = P \|\| slice_type = = SP ) ) \|\| ( weighted_bipred_idc = = 1 && slice_type = = B ) ) | | |
|         pred_weight_table( ) | 2 | |
|     if( nal_ref_idc != 0 ) | | |
|         dec_ref_pic_marking( ) | 2 | |
|     if( entropy_coding_mode_flag && slice_type != I && slice_type != SI ) | | |
|         cabac_init_idc | 2 | ue(v) |
|     slice_qp_delta | 2 | se(v) |
|     if( slice_type = = SP \|\| slice_type = = SI ) { | | |
|         if( slice_type = = SP ) | | |
|             sp_for_switch_flag | 2 | u(1) |
|         slice_qs_delta | 2 | se(v) |
|     } | | |
|     if( deblocking_filter_control_present_flag ) { | | |
|         disable_deblocking_filter_idc | 2 | ue(v) |
|         if( disable_deblocking_filter_idc != 1 ) { | | |
|             slice_alpha_c0_offset_div2 | 2 | se(v) |
|             slice_beta_offset_div2 | 2 | se(v) |
|         } | | |
|     } | | |
|     if( num_slice_groups_minus1 > 0 && slice_group_map_type >= 3 && slice_group_map_type <= 5) | | |
|         slice_group_change_cycle | 2 | u(v) |
|     if ( nal_unit_type = = 21 && ( slice_type != I && slice_type != SI )) { | | |
|         if( DepthFlag ) | | |
|             depth_weighted_pred_flag | 2 | u(1) |
|         else | | |
|             dmvp_flag | 2 | u(1) |
|     } | | |
|     } | | |
| } | | |

Note that for each view component may be either predefined or signaled in the sequence parameter set. That is, each view component may be predefined or signaled in the SPS regardless of whether it is a texture view component or depth view component.

The syntax element delta_view_idx specifies which the view order index of the view component that the current slice header is predicted from. VOIdx (view order index) of the current view minus delta_view_idx is the view order index of the reference view component. When delta_view_idx is equal to 0, the reference view component is the previous coded video component of the same view in the same access unit. A reference view component, if in a different view (such as view A), the different view (view A) must be a dependent view of the current view. The different view (view A) must be a view either directly or indirectly dependent on the current view.

The flag, from_texture_depth_flag, may be included in the slice header. When from_texture_depth_flag is equal to 1, it is indicated that the reference view component is a texture view component. When from_texture_depth_flag is equal to 0, it is indicated that the reference view component is a depth view component.

The syntax element slice_id_in_ref_view_component specifies the ID of the slice in the reference view component. When a slice header is predicted from a view component which belongs to the texture of the base view, slice_id_in_ref_view_component shall be equal to 0.

The syntax element slice_id specifies an identifier of the current slice in the current view component. The value of slice_id may be equal to 0 for the slice including the top-left coding block. The value of slice_id may increase by one for each slice in decoding order.

Alternatively, in some examples, the above condition "if (delta_view_idx>0)" can be removed from the syntax table. In that case, from_texture_depth_flag can always be signaled.

Alternatively, the syntax element slice_id may be further signaled for any view component which is not the texture of the base view.

Alternatively, the value of slice_id may be only required to be distinct for each slice in a view component. In such an example, slice_id may not need to be 0 for the slice including the top-left coding block.

The following describes the general video coding process according to H.264/AVC. A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder and decoders typically operate on video blocks within individual video frames in order to encode and/or decode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to residual video block data representing pixel differences between coded video blocks and predictive video blocks. In some cases, a video block may comprise blocks of quantized transform coefficients in the transform domain.

Smaller video blocks can have better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) applied to residual data to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), probability interval partitioning entropy (PIPE), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

A video encoder may further generate syntax data, such as block-based syntax data, frame-based syntax data, and/or GOP-based syntax data, to a video decoder, e.g., in a frame header, a block header, a slice header, or a GOP header. The GOP syntax data may describe a number of frames in the respective GOP, and the frame syntax data may indicate an encoding/prediction mode used to encode the corresponding frame. The video decoder may interpret and use the syntax data in the decoding process.

In H.264/AVC, the coded video bits are organized into Network Abstraction Layer (NAL) units, which provide a "network-friendly" video representation addressing the applications such as video telephony, storage, broadcast, or streaming. NAL units can be categorized to Video Coding Layer (VCL) NAL units and non-VCL NAL units. VCL units contain the core compression engine and comprise block, MB and slice levels. Other NAL units are non-VCL NAL units.

Each NAL unit contains a 1 byte NAL unit header. Five bits are used to specify the NAL unit type and three bits are used for nal_ref_idc, indicating how important the NAL unit is in terms of being referenced by other pictures (NAL units). This value equal to 0 means that the NAL unit is not used for inter-prediction.

Parameter sets contain the sequence-level header information in sequence parameter sets (SPS) and the infrequently changing picture-level header information in picture parameter sets (PPS). With parameter sets, this infrequently changing information does not need to be repeated for each sequence or picture, hence coding efficiency is improved. Furthermore, the use of parameter sets enables out-of-band transmission of header information, avoiding the need of redundant transmissions for error resilience. In out-of-band transmission, parameter set NAL units may be transmitted on a different channel than the other NAL units.

In MVC, inter-view prediction is supported by disparity compensation, which uses the syntax of the H.264/AVC motion compensation, but allows a picture in a different view to be used as a reference picture. That is, pictures in MVC may be inter-view predicted and coded. Disparity vectors may be used for inter-view prediction, in a manner similar to motion vectors in temporal prediction. However, rather than providing an indication of motion, disparity vectors indicate offset of data in a predicted block relative to a reference frame of a different view, to account for the horizontal offset of the camera perspective of the common scene. In this manner, a motion compensation unit may perform disparity compensation for inter-view prediction.

As mentioned above, H.264/AVC, a NAL unit includes a 1-byte header and a payload of varying size. In MVC, this structure is retained except for prefix NAL units and MVC coded slice NAL units, which includes a 4-byte header and the NAL unit payload. Syntax elements in MVC NAL unit header include priority_id, temporal_id, anchor_pic_flag, view_id, non_idr_flag and inter_view_flag.

The anchor_pic_flag syntax element indicates whether a picture is an anchor picture or non-anchor picture. Anchor pictures and all the pictures succeeding it in the output order (i.e. display order) can be correctly decoded without decoding of previous pictures in the decoding order (i.e. bitstream order) and thus can be used as random access points. Anchor pictures and non-anchor pictures can have different dependencies, both of which are signaled in the sequence parameter set.

The bitstream structure defined in MVC is characterized by two syntax elements: view_id and temporal_id. The syntax element view_id indicates the identifier of each view. This indication in NAL unit header enables easy identification of NAL units at the decoder and quick access of the decoded views for display. The syntax element temporal_id indicates the temporal scalability hierarchy or, indirectly, the frame rate. An operation point including NAL units with a smaller maximum temporal_id value has a lower frame rate than an operation point with a larger maximum temporal_id value. Coded pictures with a higher temporal_id value typically depend on the coded pictures with lower temporal_id values within a view, but not on any coded picture with a higher temporal_id.

The syntax elements view_id and temporal_id in the NAL unit header are used for both bitstream extraction and adaptation. Another syntax element in the NAL unit header is priority_id, which is used for the simple one-path bitstream adaptation process. That is, a device receiving or retrieving the bitstream may use the priority_id value to determine priorities among the NAL units when perprocessing bitstream extraction and adaptation, which allows one bitstream to be sent to multiple destination devices with varying coding and rendering capabilities.

The inter_view_flag syntax element indicates whether the NAL unit will be used for inter-view predicting another NAL unit in a different view.

In MVC, the view dependency is signaled in the SPS MVC extension. All inter-view prediction is done within the scope specified by the SPS MVC extension. View dependency indicates whether a view is dependent on another view, e.g., for inter-view prediction. Where a first view is predicted from data of a second view, the first view is said to be dependent on the second view. Table 6 below represents an example of the MVC extension for the SPS.

TABLE 6

| seq_parameter_set_mvc_extension( ) { | C | Descriptor |
|---|---|---|
| num_views_minus1 | 0 | ue(v) |
| for( i = 0; i <= num_views_minus1; i++ ) | | |
| view_id[ i ] | 0 | ue(v) |
| for( i = 1; i <= num_views_minus1; i++ ) { | | |
| num_anchor_refs_l0[ i ] | 0 | ue(v) |
| for( j = 0; j < num_anchor_refs_l0[ i ]; j++ ) | | |
| anchor_ref_l0[ i ][ j ] | 0 | ue(v) |
| num_anchor_refs_l1[ i ] | 0 | ue(v) |
| for( j = 0; j < num_anchor_refs_l1[ i ]; j++ ) | | |
| anchor_ref_l1[ i ][ j ] | 0 | ue(v) |
| } | | |
| for( i = 1; i <= num_views_minus1; i++ ) { | | |
| num_non_anchor_refs_l0[ i ] | 0 | ue(v) |
| for( j = 0; j < num_non_anchor_refs_l0[ i ]; j++ ) | | |
| non_anchor_ref_l0[ i ][ j ] | 0 | ue(v) |
| num_non_anchor_refs_l1[ i ] | 0 | ue(v) |
| for( j = 0; j < num_non_anchor_refs_l1[ i ]; j++ ) | | |
| non_anchor_ref_l1[ i ][ j ] | 0 | ue(v) |
| } | | |
| num_level_values_signalled_minus1 | 0 | ue(v) |
| for( i = 0; | | |

TABLE 6-continued

| seq_parameter_set_mvc_extension( ) { | C | Descriptor |
|---|---|---|
| i <= num_level_values_signalled_minus1; i++) { | | |
| level_idc[ i ] | 0 | u(8) |
| num_applicable_ops_minus1[ i ] | 0 | ue(v) |
| for( j = 0; | | |
| j <= num_applicable_ops_minus1[ i ]; j++ ) { | | |
| applicable_op_temporal_id[ i ][ j ] | 0 | u(3) |
| applicable_op_num_target_views_minus1 [ i ][ j ] | 0 | ue(v) |
| for( k = 0; k <= applicable_op_num_target_views_minus1[ i ][ j ]; k++ ) | | |
| applicable_op_target_view_id[ i ][ j ][ k ] | 0 | ue(v) |
| applicable_op_num_views_minus1[ i ][ j ] | 0 | ue(v) |
| } | | |
| } | | |
| } | | |

Figure 5:
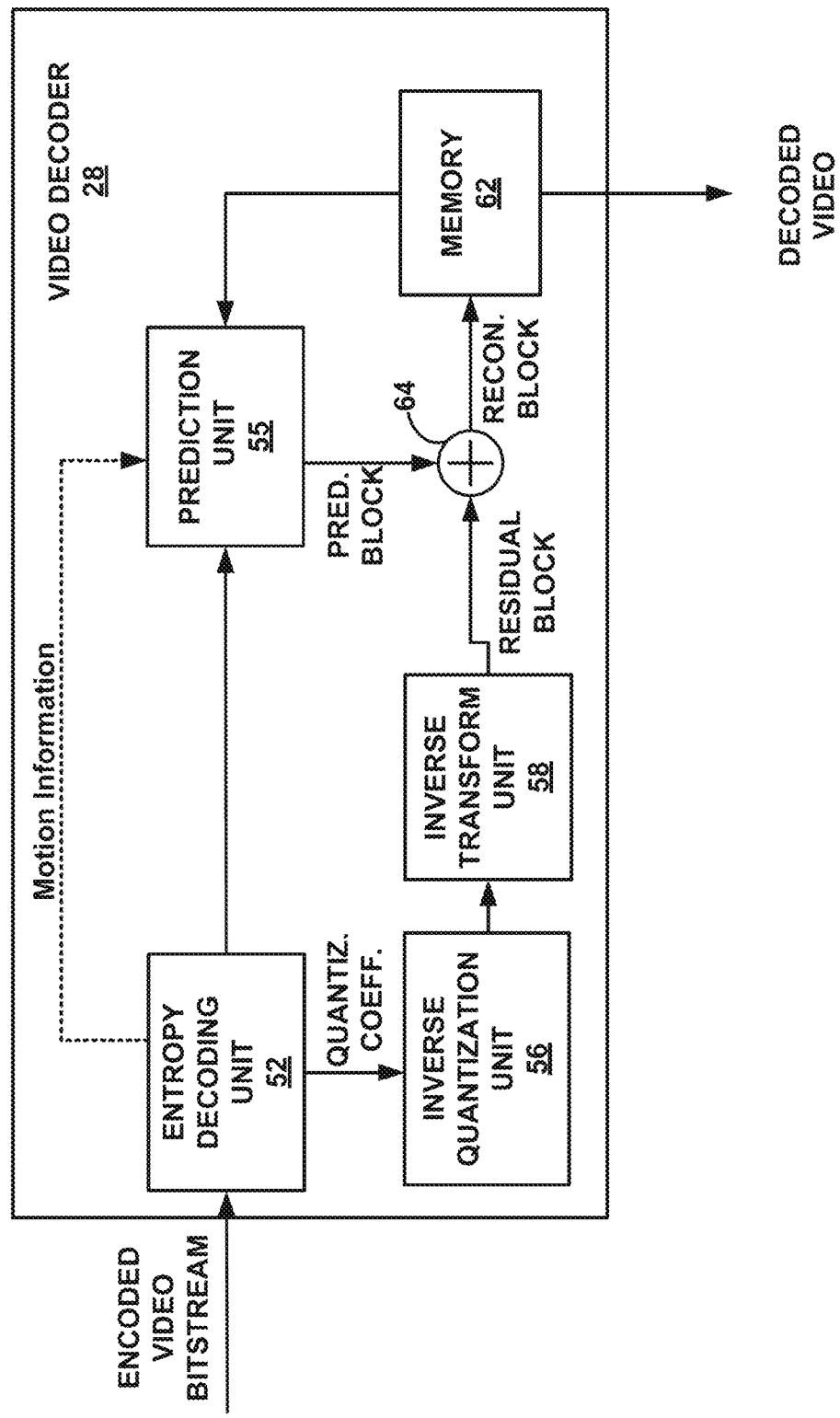
FIG. 5 is a block diagram illustrating an example of the video decoder of FIG. 1 in further detail, according to techniques of the present disclosure.

FIG. 5 is a block diagram illustrating an example of the video decoder 28 of FIG. 1 in further detail, according to techniques of the present disclosure. Video decoder 28 is one example of a specialized video computer device or apparatus referred to herein as a "coder." As shown in FIG. 5, video decoder 28 corresponds to video decoder 28 of destination device 16. However, in other examples, video decoder 28 corresponds to a different device. In further examples, other units (such as, for example, other encoder/decoder (CODECS)) can also perform similar techniques as video decoder 28.

Video decoder 28 includes an entropy decoding unit 52 that entropy decodes the received bitstream to generate quantized coefficients and the prediction syntax elements. The bitstream includes coded blocks having texture components and a depth component for each pixel location in order to render a 3D video and syntax elements. The prediction syntax elements includes at least one of a coding mode, one or more motion vectors, information identifying an interpolation technique used, coefficients for use in interpolation filtering, and other information associated with the generation of the prediction block.

The prediction syntax elements, e.g., the coefficients, are forwarded to prediction processing unit 55. Prediction processing unit 55 includes a depth syntax prediction module 66. If prediction is used to code the coefficients relative to coefficients of a fixed filter, or relative to one another, prediction processing unit 55 decodes the syntax elements to define the actual coefficients. Depth syntax prediction module 66 predicts depth syntax elements for the depth view components from texture syntax elements for the texture view components.

If quantization is applied to any of the prediction syntax elements, inverse quantization unit 56 removes such quantization. Inverse quantization unit 56 may treat the depth and texture components for each pixel location of the coded blocks in the encoded bitstream differently. For example, when the depth component was quantized differently than the texture components, inverse quantization unit 56 processes the depth and texture components separately. Filter coefficients, for example, may be predictively coded and quantized according to this disclosure, and in this case, inverse quantization unit 56 is used by video decoder 28 to predictively decode and de-quantize such coefficients.

Prediction processing unit 55 generates prediction data based on the prediction syntax elements and one or more previously decoded blocks that are stored in memory 62, in much the same way as described in detail above with respect to prediction processing unit 32 of video encoder 22. In particular, prediction processing unit 55 performs one or more of the multi-view video plus depth techniques of this disclosure during motion compensation to generate a prediction block incorporating depth components as well as texture components. The prediction block (as well as a coded block) may have different resolution for the depth components versus the texture components. For example, the depth components have quarter-pixel precision while the texture components have full-integer pixel precision. As such, one or more of the techniques of this disclosure is used by video decoder 28 in generating a prediction block. In some examples, prediction processing unit 55 may include a motion compensation unit that comprises filters used for interpolation and interpolation-like filtering techniques of this disclosure. The motion compensation component is not shown in FIG. 5 for simplicity and ease of illustration.

Inverse quantization unit 56 inverse quantizes, i.e., de-quantizes, the quantized coefficients. The inverse quantization process is a process defined for H.264 decoding or for any other decoding standard. Inverse transform processing unit 58 applies an inverse transform, e.g., an inverse DCT or conceptually similar inverse transform process, to the transform coefficients in order to produce residual blocks in the pixel domain. Adder 64 sums the residual block with the corresponding prediction block generated by prediction processing unit 55 to form a reconstructed version of the original block encoded by video encoder 22. If desired, a deblocking filter is also applied to filter the decoded blocks in order to remove blockiness artifacts. The decoded video blocks are then stored in memory 62, which includes reference blocks for subsequent motion compensation and also produces decoded video to drive display device (such as display device 30 of FIG. 1).

The decoded video may be used to render 3D video. The 3D video may comprise a three dimensional virtual view. Depth information is used to determine a horizontal offset (horizontal disparity) for each pixel in the block. Occlusion handling can also be performed to generate the virtual view. Syntax elements for the depth view components may be predicted from syntax elements for the texture view components.

Figure 6:
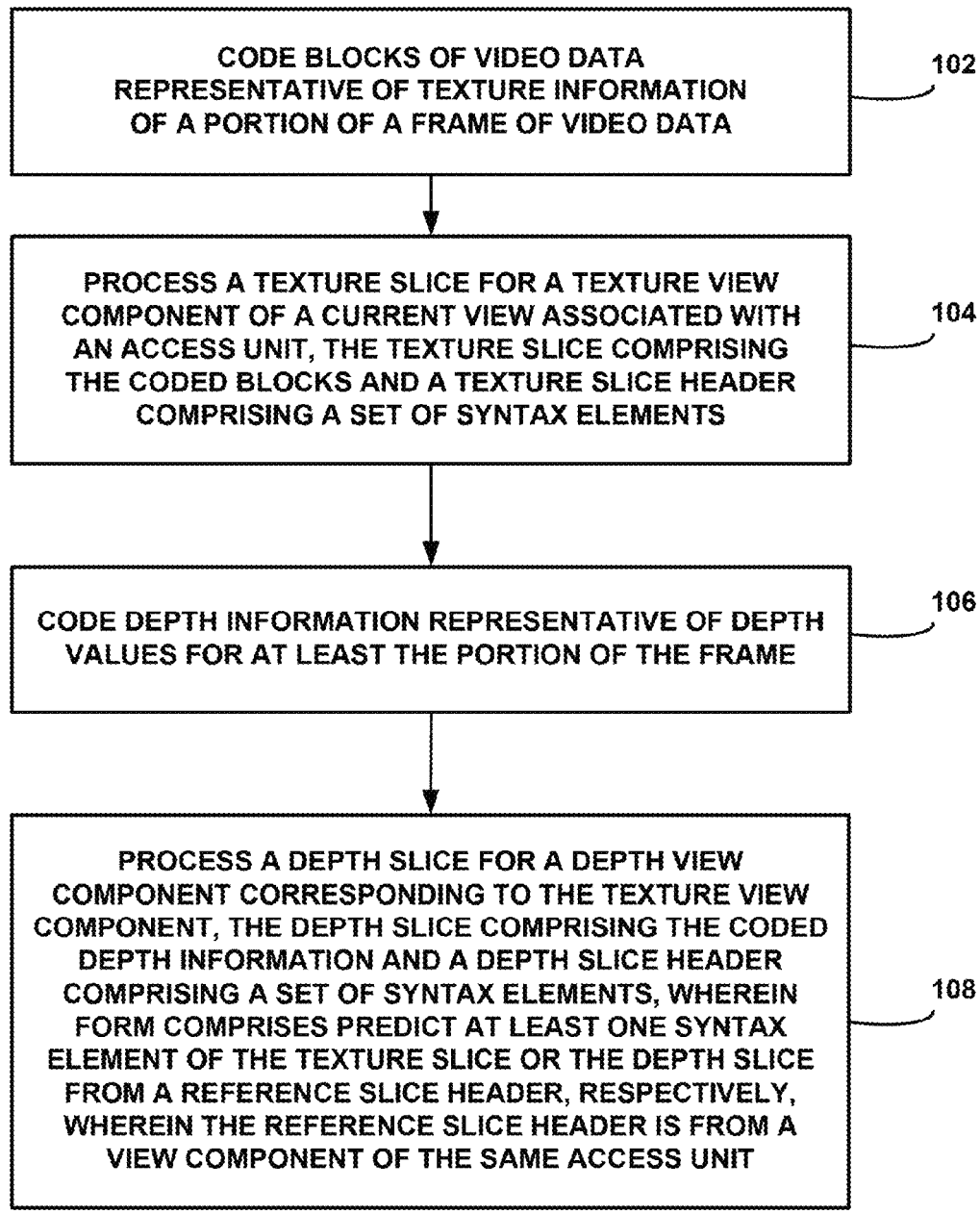
FIG. 6 is a flow diagram illustrating an example operation of a video coder, according to techniques of the present disclosure.

FIG. 6 is a flow diagram illustrating an example operation of a video coder, according to techniques of the present disclosure. In some examples, the video coder is a video encoder, such as video encoder 22 shown in FIGS. 1 and 2. In other examples, the video coder is a video decoder, such as video decoder 28 shown in FIGS. 1 and 5.

The example method of coding video data includes coding one or more blocks of video data representative of texture information of at least a portion of a frame of the video data (102). For example, video decoder 28 receives an encoded block of video data. In another example, video encoder 22 receives an encoded block of video data.

The example further includes processing a texture slice for a texture view component of a current view associated with an access unit, the texture slice comprising the coded one or more blocks and a texture slice header comprising a set of syntax elements representative of characteristics of the texture slice (104). For example, video decoder 28 receives the encoded texture slice. In another example, video encoder 22 generates the texture slice.

The example method further includes coding depth information representative of depth values for at least the portion of the frame (106). The method also includes processing a depth slice for a depth view component corresponding to the texture view component of the view, the depth slice comprising the coded depth information and a depth slice header comprising a set of syntax elements representative of characteristics of the depth slice (108). Processing the texture slice or the depth slice may include predicting at least one syntax element of at least one of the set of syntax elements representative of characteristics of the texture slice or set of syntax elements representative of characteristics of the depth slice from a reference slice header, respectively, wherein the reference slice header is from a view component of the same access unit.

In some examples, coding the current view based on the predicted syntax elements comprises encoding the current view. In other examples, coding the current view based on the predicted syntax elements comprises decoding the current view.

The reference slice header may be one of the texture view component or the depth view component. The reference slice header may comprise an Advanced Video Coding (AVC) compatible base texture view of the same access unit. The set of syntax elements representative of characteristics of the texture slice and the set of syntax elements representative of characteristics of the depth slice in an order different from an AVC slice header order. For example, the AVC slide header may have a typical specific order for the syntax elements.

In some examples, an index indicating the reference slice header is signaled. The index may be signaled as a delta view order, wherein the delta view order indicates the location of the reference slice header relative to the current view. The reference slice header may be associated with another view in a same access unit as the current view. The method may further include signaling the syntax element in a slice header extension.

A flag may be signaled that indicates if the reference slice header corresponds to the depth view component or the texture view component. A slice ID of the depth slice or the texture slice of the indicated depth or texture view component, respectively, may also be signaled in the slice header. The method may also include signaling a slice ID for the depth slice and the texture slice, wherein the slice ID is signaled in at least one of the slice header or a network abstraction layer (NAL) unit header of a NAL unit of the view component. In another example, the method also includes signaling a slice ID for the depth slice and the texture slice, wherein the slice ID is signaled in an access unit including a network abstraction layer (NAL) unit of the depth view component and the texture view component, respectively. As described herein, signaling is in a coded bitstream.

For example, video decoder 28 receives a slice ID. Video decoder 28 receives an index indicating the reference slice header. In some examples, the index comprises a delta view order, wherein the delta view order indicates the location of the reference slice header relative to the current view, and wherein the reference slice header is associated with another view in a same access unit as the current view. Video decoder 28 receives a flag indicating if the reference slice header corresponds to the depth view component or the texture view component. In another example, video decoder 28 receives a slice ID of the depth slice or the texture slice of the indicated depth or texture view component, respectively. The video decoder 28 receives a slice ID for the depth slice and the texture slice, wherein the slice ID is signaled in at least one of the slice header or a network abstraction layer (NAL) unit header of a NAL unit of the view component. The video decoder 28 receives a slice ID for the depth slice and the texture slice, wherein the slice ID is signaled in an access unit including a network abstraction layer (NAL) unit of the depth view component and the texture view component, respectively. Furthermore, the video decoder 28 receives the syntax element in a slice header extension.

In some examples, the syntax element is a reference picture list. The reference picture list may be predicted from the reference slice header with a reference picture list inherit flag, wherein the reference picture list inherit flag with a value of 1 indicates that reference picture list construction syntax elements for the current view are copied from the reference slice header, and wherein the reference picture list inherit flag with a value of 0 indicates that reference picture list construction syntax elements for the current view are not copied from the reference slice header. In another example, the reference picture list may be predicted from the reference slice header with a reference picture list insertion flag, wherein the reference picture list insertion flag with a value of 1 indicates that reference pictures from the reference slice header are added to the reference picture list of the current view. In another example, the reference picture list may be predicted from the reference slice header with a reference picture exclusion flag, wherein the reference picture exclusion flag with a value of 1 indicates that reference pictures from the reference slice header are excluded from the reference picture list of the current view. In some example, the method further includes modifying a reference picture list modification when prediction of the reference picture list modification is enabled, based on at least one a reference picture list exclusion or a insertion syntax table.

A video coder receives a texture slice comprising a texture slice header comprising syntax elements representative of characteristics of the texture slice (102). For example, a video coder receives a texture slice for a texture view component associated with one or more coded blocks of video data representative of texture information, the texture slice comprising the encoded one or more blocks and a texture slice header comprising syntax elements representative of characteristics of the texture slice. The method further includes receiving a depth slice comprising a depth slice header comprising syntax elements representative of characteristics of the depth slice (104). For example, the video coder receives a depth slice for a depth view component associated with one or more coded blocks of depth information corresponding to the texture view component, wherein the depth slice comprises the one or more coded blocks of depth information and a depth slice header comprising syntax elements representative of characteristics of the depth slice. In some examples, the depth view component and the texture view component both belong to a view and an access unit.

The method further comprises coding a first slice, wherein the first slice comprises one of the texture slice and the depth slice, wherein the first slice has a slice header comprising syntax elements representative of characteristics of the first slice (106). For example, video encoder 22 encodes a first slice, wherein the first slice comprises one of the texture slice and the depth slice, wherein the first slice has a slice header comprising syntax elements representative of characteristics of the first slice. In one example, the slice header comprises all the syntax elements used to code the associated slice. In another example, video decoder 28 decodes a first slice, wherein the first slice comprises one of the texture slice and the depth slice, wherein the first slice has a slice header comprising syntax elements representative of characteristics of the first slice.

The method further comprises determining common syntax elements for a second slice from the slice header of the first slice (108). Further, the method comprises coding the second slice after coding the first slice at least partially based on the determined common syntax elements, wherein the second slice has a slice header comprising syntax elements representative of characteristics of the second slice excluding values for syntax elements that are common to the first slice (110). For example, video encoder 22 may encoding the second slice after coding the first slice at least partially based on the determined common syntax elements, wherein the second slice comprises one of the texture slice and the depth slice that is not the first slice, wherein the second slice has a slice header comprising syntax elements representative of characteristics of the second slice, excluding values for syntax elements that are common to the first slice. Similarly, video decoder 28 may decode the second slice after coding the first slice at least partially based on the determined common syntax elements, wherein the second slice comprises one of the texture slice and the depth slice that is not the first slice, wherein the second slice has a slice header comprising syntax elements representative of characteristics of the second slice, excluding values for syntax elements that are common to the first slice.

In other examples, the method further comprises signaling an indication of which syntax elements are explicitly signaled in the slice header of the second slice in the sequence parameter set.

In other examples, at least one depth syntax element is determined and signaled in a slice header of the depth view component. The at least one depth syntax elements may include a picture parameter set identifier, a quantization parameter difference between a quantization parameter of the slice and a quantization parameter signaled in a picture parameter set, a starting position of the coded block unit, an order of the reference pictures, or a display order of the current picture of the depth view component. For example, the slice header of the second slice comprises at least a signaled syntax element of an identification of a referring picture parameter set. In another example, the slice header of the second slice comprises at least a signaled syntax element of a quantization parameter difference between a quantization parameter of the second slice and a quantization parameter signaled in a picture parameter set. In another example, the slice header of the second slice comprises at least a signaled syntax element of a starting position of the coded block. Further, the slice header of the second slice may comprise at least one of a frame number and a picture order count of the second slice. In another example, the slice header of the second slice comprises at least one of the syntax elements related to a reference picture list construction, a number of active reference frames for each list, a reference picture list modification syntax tables, and a prediction weight table.

A starting position of the coded block unit may be determined to be zero when a starting position of the coded block is not signaled in the texture slice header or the depth slice header. A loop filter parameter for the at least one texture view component may be signaled, and a flag set that indicates a loop filter parameter used for the depth view component is the same as a loop filter parameter for the at least one texture view component. For example, the slice header of the second slice comprises at least one of the syntax elements related to deblocking filter parameters or adaptive loop filtering parameters for the second slice.

In another example, the one or more blocks of video data representative of texture information are encoded using inter-view prediction while the depth values for a corresponding portion of the frame are encoded using intra-view prediction. A video frame having texture view components and depth view components may correspond to a first view. Encoding one or more blocks of video data representative of texture information may include predicting at least a portion of at least one of the blocks of video data representative of texture information relative to data of a second view, wherein the second view is different from the first view. Encoding depth information representative of depth values for the portion of the frame further comprises predicting at least a portion of the depth information representative of depth values relative to data of the first view. The depth slice header may further signal syntax elements representative of a reference picture list construction for the depth map view component.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be included within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of this disclosure have been described. These and other examples are within the scope of the following claims.

The invention claimed is:

1. A method of coding video data, the method comprising:
coding one or more blocks of video data representative of texture information of at least a portion of a frame of the video data;
processing a texture slice for a texture view component of a current view associated with an access unit, the texture slice comprising the coded one or more blocks and a texture slice header comprising syntax elements related to reference picture list construction for the texture slice;
coding depth information representative of depth values for at least the portion of the frame; and
processing a depth slice for a depth view component corresponding to the texture view component of the view, the depth slice comprising the coded depth information and a depth slice header comprising syntax elements related to reference picture list construction for the depth slice;
wherein at least one of:
processing the texture slice comprises:
coding, in a slice header extension of the texture slice header, a syntax element indicating that a reference slice header for the texture slice is a slice header associated with another view of the same access unit as the current view;
coding, in the slice header extension of the texture slice, a reference picture prediction syntax element that indicates whether the syntax elements related to reference picture list construction for the texture slice are predicted from the reference slice header for the texture slice, wherein a first value of the reference picture prediction syntax element for the texture slice indicates that the syntax elements of the texture slice header related to reference picture list construction for the texture slice are copied from the reference slice header for the texture slice, and wherein a second value of the reference picture prediction syntax element for the texture slice indicates that the syntax elements of the texture slice header related to reference picture list construction for the texture slice are not copied from the reference slice header for the texture slice; and predicting at least one syntax element of the syntax elements of the texture slice header related to reference picture list construction for the texture slice from the reference slice header for the texture slice, or processing the depth slice comprises:

coding, in a slice header extension of the depth slice header, a syntax element indicating that a reference slice header for the depth slice is a slice header associated with the other view of the same access unit as the current view;

coding, in the slice header extension of the depth slice, a reference picture prediction syntax element that indicates whether the syntax elements related to reference picture list construction for the depth slice are predicted from the reference slice header for the depth slice, wherein a first value of the reference picture prediction syntax element for the depth slice indicates that the syntax elements of the depth slice header related to reference picture list construction for the depth slice are copied from the reference slice header for the depth slice, and wherein a second value of the reference picture prediction syntax element for the depth slice indicates that the syntax elements of the depth slice header related to reference picture list construction for the depth slice are not copied from the reference slice header for the depth slice; and predicting at least one syntax element of the set of syntax elements of the depth slice header related to reference picture list construction for the depth slice from the reference slice header for the depth slice.

2. The method of claim 1, wherein the reference slice header for the texture view or the reference slice header for the depth view comprises a slice header from one of a texture view component or a depth view component of the other view.

3. The method of claim 2, wherein the other view comprises an Advanced Video Coding (AVC) compatible base view of the same access unit.

4. The method of claim 1, further comprising:

arranging the set of syntax elements representative of characteristics of the texture slice and the set of syntax elements representative of characteristics of the depth slice in an order different from an AVC slice header order.

5. The method of claim 1, wherein coding the one or more blocks of video data and the depth information comprises decoding the one or more blocks of video data and the depth information, wherein processing the texture slice comprises receiving the texture slice, wherein processing the depth slice comprises receiving the depth slice, wherein coding the syntax element indicating the reference slice header for the texture slice comprises receiving the syntax element indicating the reference slice header for the texture slice, wherein coding the reference picture prediction syntax element for the texture slice comprises decoding the reference picture prediction syntax element for the texture slice, wherein coding the reference picture prediction syntax element for the depth slice comprises decoding the reference picture prediction syntax element for the depth slice, and wherein coding the syntax element indicating the reference slice header for the depth slice comprises receiving the syntax element indicating the reference slice header for the depth slice.

6. The method of claim 1, wherein one or both of:

the syntax element indicating the reference slice header for the texture slice comprises a delta view order, and wherein the delta view order indicates the location of the reference slice header for the texture slice relative to the current view, or the syntax element indicating the reference slice header for the depth slice comprises a delta view order, and wherein the delta view order indicates the location of the reference slice header for the depth slice relative to the current view.

7. The method of claim 5, comprising:

receiving, in the slice header extension of the texture slice, a syntax element indicating if the reference slice header for the texture slice corresponds to a slice header of the depth view component of the other view or a slice header of the texture view component of the other view; or receiving, in the slice header extension of the depth slice, a syntax element indicating if the reference slice header for the depth slice corresponds to the slice header of the depth view component of the other view or the slice header of the texture view component of the other view.

8. The method of claim 7, further comprising:

receiving a slice ID of the depth slice or the texture slice of the indicated depth or texture view component, respectively.

9. The method of claim 7, further comprising:

receiving a slice ID for the depth slice and the texture slice, wherein the slice ID is signaled in at least one of the slice header or a network abstraction layer (NAL) unit header of a NAL unit of the view component.

10. The method of claim 7, further comprising:

receiving a slice ID for the depth slice and the texture slice, wherein the slice ID is signaled in an access unit including a network abstraction layer (NAL) unit of the depth view component and the texture view component, respectively.

11. The method of claim 1, wherein coding the one or more blocks of video data and the depth information comprises encoding the one or more blocks of video data and the depth information, wherein processing the texture slice comprises encoding the texture slice, wherein processing the depth slice comprises encoding the depth slice, wherein coding the syntax element indicating the reference slice header for the texture slice comprises encoding the syntax element indicating the reference slice header for the texture slice, wherein coding the reference picture prediction syntax element for the texture slice comprises encoding the reference picture prediction syntax element for the texture slice, wherein coding the reference picture prediction syntax element for the depth slice comprises encoding the reference picture prediction syntax element for the depth slice, and wherein coding the syntax element indicating the reference slice header for the depth slice comprises encoding the syntax element indicating the reference slice header for the depth slice.

12. The method of claim 11, further comprising:

encoding, in the slice header extension of the texture slice, a syntax element indicating if the reference slice header for the texture slice corresponds to a slice header of the depth view component of the other view or a slice header of the texture view component of the other view; or encoding, in the slice header extension of the depth slice, a syntax element indicating if the reference slice header for the depth view corresponds to the slice header of the depth view component of the other view or the slice header of the texture view component of the other view.

13. A device for coding video data comprising:
a memory configured to store data associated with video data; and
one or more processors configured to:
code one or more blocks of video data representative of texture information of at least a portion of a frame of the video data;
process a texture slice for a texture view component of a current view associated with an access unit, the texture slice comprising the coded one or more blocks and a texture slice header comprising syntax elements related to reference picture list construction for the texture slice;
code depth information representative of depth values for at least the portion of the frame; and
process a depth slice for a depth view component corresponding to the texture view component of the view, the depth slice comprising the coded depth information and a depth slice header comprising syntax elements related to reference picture list construction for the depth slice,
wherein, to process the texture slice or the depth slice, the one or more processors are configured to:
code, in a slice header extension of the texture slice header, a syntax element indicating that a reference slice header for the texture slice is a slice header associated with another view of the same access unit as the current view;
code, in the slice header extension of the texture slice, a reference picture prediction syntax element that indicates whether the syntax elements related to reference picture list construction for the texture slice are predicted from the reference slice header for the texture slice, wherein a first value of the reference picture prediction syntax element for the texture slice indicates that the syntax elements of the texture slice header related to reference picture list construction for the texture slice are copied from the reference slice header for the texture slice, and wherein a second value of the reference picture prediction syntax element for the texture slice indicates that the syntax elements of the texture slice header related to reference picture list construction for the texture slice are not copied from the reference slice header for the texture slice; and
predict at least one syntax element of the syntax elements of the texture slice header related to reference picture list construction for the texture slice from the reference slice header for the texture slice;
or
code, in a slice header extension of the depth slice header, a syntax element indicating that a reference slice header for the depth slice is a slice header associated with the other view of the same access unit as the current view;
code, in the slice header extension of the depth slice, a reference picture prediction syntax element that indicates whether the syntax elements related to reference picture list construction for the depth slice are predicted from the reference slice header for the depth slice, wherein a first value of the reference picture prediction syntax element for the depth slice indicates that the syntax elements of the depth slice header related to reference picture list construction for the depth slice are copied from the reference slice header for the depth slice, and wherein a second value of the reference picture prediction syntax element for the depth slice indicates that the syntax elements of the depth slice header related to reference picture list construction for the depth slice are not copied from the reference slice header for the depth slice; and
predict at least one syntax element of the set of syntax elements of the depth slice header related to reference picture list construction for the depth slice from the reference slice header for the depth slice.

14. The device of claim 13, wherein the reference slice header for the texture view or the reference slice header for the depth view comprises a slice header from one of a texture view component of the other view or a depth view component from the other view.

15. The device of claim 13, wherein the other view comprises an Advanced Video Coding (AVC) compatible base view of the same access unit.

16. The device of claim 13, wherein the one or more processors are further configured to arrange the set of syntax elements representative of characteristics of the texture slice and the set of syntax elements representative of characteristics of the depth slice in an order different from an AVC slice header order.

17. The device of claim 13, wherein the device for coding video data is a device for decoding video data, and wherein the one or more processors are configured to:
decode the one or more blocks of video data and the depth information,
receive the texture slice,
receive the depth slice,
receive the syntax element indicating the reference slice header for the texture slice,
receive the reference picture prediction syntax element for the texture slice,
receive the reference picture prediction syntax element for the depth slice, and
receive the syntax element indicating the reference slice header for the depth slice.

18. The device of claim 13, wherein one or both of:
the syntax element indicating the reference slice header for the texture slice comprises a delta view order, and wherein the delta view order indicates the location of the reference slice header for the texture slice relative to the current view, or
the syntax element indicating the reference slice header for the depth slice comprises a delta view order, and wherein the delta view order indicates the location of the reference slice header for the depth slice relative to the current view.

19. The device of claim 17, wherein the one or more processors are configured to:
receive, in the slice header extension of the texture slice, a syntax element indicating if the reference slice header for the texture slice corresponds to a slice header of the depth view component of the other view or the texture view component of the other view; or
receive, in the slice header extension of the depth slice, a syntax element indicating if the reference slice header for the depth slice corresponds to the slice header of the depth view component of the other view or the slice header of the texture view component of the other view.

20. The device of claim 17, wherein the one or more processors are further configured to receive a slice ID of the depth slice or the texture slice of the indicated depth or texture view component, respectively.

21. The device of claim 17, wherein the one or more processors are further configured to receive a slice ID for the depth slice and the texture slice, wherein the slice ID is received in at least one of the slice header or a network abstraction layer (NAL) unit header of a NAL unit of the view component.

22. The device of claim 17, wherein the one or more processors are further configured to receive a slice ID for the depth slice and the texture slice, wherein the slice ID is signaled in an access unit including a network abstraction layer (NAL) unit of the depth view component and the texture view component, respectively.

23. The device of claim 13, wherein the device for coding video data is a device for encoding video data, and wherein the one or more processors are configured to: encode the one or more blocks of video data and the depth information,
    encode the texture slice,
    encode the depth slice,
    encode the syntax element indicating the reference slice header for the texture slice,
    receive the reference picture prediction syntax element for the texture slice,
    receive the reference picture prediction syntax element for the depth slice, and
    encode the syntax element indicating the reference slice header for the depth slice.

24. The device of claim 23, wherein the one or more processors are further configured to:
    encode, in the slice header extension of the texture slice, a syntax element indicating if the reference slice header for the texture slice corresponds to a slice header of the depth view component of the other view or a slice header of the texture view component of the other view; or
    encode, in the slice header extension of the depth slice, a syntax element indicating if the reference slice header for the depth view corresponds to the slice header of the depth view component of the other view or the slice header of the texture view component of the other view.

25. A non-transitory computer-readable storage medium having stored thereon instructions that, when executed, cause one or more processors of a video coding device to:
    code one or more blocks of video data representative of texture information of at least a portion of a frame of the video data;
    process a texture slice for a texture view component of a current view associated with an access unit, the texture slice comprising the coded one or more blocks and a texture slice header comprising syntax elements related to reference picture list construction for the texture slice;
    code depth information representative of depth values for at least the portion of the frame; and
    process a depth slice for a depth view component corresponding to the texture view component of the view, the depth slice comprising the coded depth information and a depth slice header comprising syntax elements related to reference picture list construction for the depth slice;

wherein the instructions that cause the one or more processors to process the texture slice or the depth slice comprises comprise instructions that cause the one or more processors to:
    code, in a slice header extension of the texture slice header, a syntax element indicating that a reference slice header for the texture slice is a slice header associated with another view of the same access unit as the current view;
    code, in the slice header extension of the texture slice, a reference picture prediction syntax element that indicates whether the syntax elements related to reference picture list construction for the texture slice are predicted from the reference slice header for the texture slice, wherein a first value of the reference picture prediction syntax element for the texture slice indicates that the syntax elements of the texture slice header related to reference picture list construction for the texture slice are copied from the reference slice header for the texture slice, and wherein a second value of the reference picture prediction syntax element for the texture slice indicates that the syntax elements of the texture slice header related to reference picture list construction for the texture slice are not copied from the reference slice header for the texture slice; and
    predict at least one syntax element of the set of syntax elements of the texture slice header related to reference picture list construction for the texture slice from the reference slice header for the texture slice;
    or
    code, in a slice header extension of the depth slice header, a syntax element indicating that a reference slice header for the depth slice is a slice header associated with the other view of the same access unit as the current view;
    code, in the slice header extension of the depth slice, a reference picture prediction syntax element that indicates whether the syntax elements related to reference picture list construction for the depth slice are predicted from the reference slice header for the depth slice, wherein a first value of the reference picture prediction syntax element for the texture slice indicates that the syntax elements of the depth slice header related to reference picture list construction for the depth slice are copied from the reference slice header for the depth slice, and wherein a second value of the reference picture prediction syntax element for the texture slice indicates that the syntax elements of the depth slice header related to reference picture list construction for the depth slice are not copied from the reference slice header for the depth slice; and
    predict at least one syntax element of the set of syntax elements of the depth slice header related to reference picture list construction for the depth slice from reference slice header for the depth slice, respectively, wherein the reference slice header is from a view component of the same access unit.

26. The non-transitory computer-readable storage medium of claim 25, wherein the reference slice header for the texture view or the reference slice header for the depth view comprises a slice header from one of a texture view component of the other view or a depth view component from the other view.

27. The non-transitory computer-readable storage medium of claim 25, wherein the other view comprises an Advanced Video Coding (AVC) compatible base view of the same access unit.

28. The non-transitory computer-readable storage medium of claim 25, wherein the instructions cause the one or more processors to:
decode the one or more blocks of video data and the depth information,
receive the texture slice,
receive the depth slice,
receive the syntax element indicating the reference slice header for the texture slice,
receive the reference picture prediction syntax element for the texture slice,
receive the reference picture prediction syntax element for the depth slice, and
receive the syntax element indicating the reference slice header for the depth slice.

29. The non-transitory computer-readable storage medium of claim 28, wherein one or both of:
the syntax element indicating the reference slice header for the texture slice comprises a delta view order, and wherein the delta view order indicates the location of the reference slice header for the texture view relative to the current view, or
the syntax element indicating the reference slice header for the depth slice comprises a delta view order, and wherein the delta view order indicates the location of the reference slice header for the depth slice relative to the current view.

30. The non-transitory computer-readable storage medium of claim 28, wherein the instructions further cause the one or more processors of the video coding device to:
receive, in the slice header extension of the texture slice, a syntax element indicating if the reference slice header for the texture slice corresponds to a slice header of the depth view component of the other view or a slice header of the texture view component of the other view; or
receive, in the slice header extension of the depth slice, a syntax element indicating if the reference slice header for the depth slice corresponds to the slice header of the depth view component of the other view or the slice header of the texture view component of the other view.

31. The non-transitory computer-readable storage medium of claim 28, wherein the instructions further cause the one or more processors of the video coding device to:
receive a slice ID of the depth slice or the texture slice of the indicated depth or texture view component, respectively.

32. The non-transitory computer-readable storage medium of claim 28, wherein the instructions further cause the one or more processors of the video coding device to:
receive a slice ID for the depth slice and the texture slice, wherein the slice ID is received in at least one of the slice header or a network abstraction layer (NAL) unit header of a NAL unit of the view component.

33. The non-transitory computer-readable storage medium of claim 28, wherein the instructions further cause the one or more processors of the video coding device to:
receive a slice ID for the depth slice and the texture slice, wherein the slice ID is received in an access unit including a network abstraction layer (NAL) unit of the depth view component and the texture view component, respectively.

34. The non-transitory computer-readable storage medium of claim 25, wherein the instructions cause the one or more processors to:
encode the one or more blocks of video data and the depth information,
encode the texture slice,
encode the depth slice,
encode the syntax element indicating the reference slice header for the texture slice,
encode the reference picture prediction syntax element for the texture slice,
encode the reference picture prediction syntax element for the texture slice, and
encode the syntax element indicating the reference slice header for the depth slice.

35. A device for processing video data, comprising:
means for coding one or more blocks of video data representative of texture information of at least a portion of a frame of the video data;
means for processing a texture slice for a texture view component of a current view associated with an access unit, the texture slice comprising the coded one or more blocks and a texture slice header comprising syntax elements related to reference picture list construction for the texture slice;
means for coding depth information representative of depth values for at least the portion of the frame; and
means for processing a depth slice for a depth view component corresponding to the texture view component of the view, the depth slice comprising the coded depth information and a depth slice header comprising syntax elements related to reference picture list construction for the depth slice;
wherein means for processing the texture slice or the depth slice comprise:
means for coding, in a slice header extension of the texture slice header, a syntax element indicating that a reference slice header for the texture slice is a slice header associated with another view of the same access unit as the current view;
means for coding, in the slice header extension of the texture slice, a reference picture prediction syntax element that indicates whether the syntax elements related to reference picture list construction for the texture slice are predicted from the reference slice header for the texture slice, wherein a first value of the reference picture prediction syntax element for the texture slice indicates that the syntax elements of the texture slice header related to reference picture list construction for the texture slice are copied from the reference slice header for the texture slice, and wherein a second value of the reference picture prediction syntax element for the texture slice indicates that the syntax elements of the texture slice header related to reference picture list construction for the texture slice are not copied from the reference slice header for the texture slice; and
means for predicting at least one syntax element of the set of syntax elements of the texture slice header related to reference picture list construction for the texture slice from the reference slice header for the texture slice;
or
means for coding, in a slice header extension of the depth slice header, a syntax element indicating that a reference slice header for the depth slice is a slice header associated with the other view of the same access unit as the current view, wherein a first value of the reference picture prediction syntax element for the depth slice indicates that the syntax elements of the depth slice header related to reference picture list construction for the depth slice are copied from the reference slice header for the depth slice, and wherein a second value of the reference picture prediction syntax element for the depth slice indicates that the syntax elements of the depth slice header related to reference picture list construction for the depth slice are not copied from the reference slice header for the depth slice; and means for predicting at least one syntax element of the set of syntax elements related to reference picture list construction for the depth slice from a reference slice header, respectively, wherein the reference slice header is from a view component of the same access unit.

36. The device of claim 35, wherein the reference slice header for the texture view or the reference slice header for the depth view comprises a slice header from one of a texture view component of the other view or a depth view component from the other view.

37. The device of claim 35, wherein the other view comprises an Advanced Video Coding (AVC) compatible base view of the same access unit.

38. The device of claim 35, wherein the device is a video decoder.

39. The device of claim 38, wherein one or both of
the slice element indicating the reference slice header for the texture slice comprises a delta view order, and wherein the delta view order indicates the location of the reference slice header relative to the current view, or
the syntax element indicating the reference slice header for the depth slice comprises a delta view order, and wherein the delta view order indicates the location of the reference slice header for the depth slice relative to the current view.

40. The device of claim 38, wherein the video decoder further comprises:
means for receiving, in the slice header extension of the texture slice, a syntax element indicating if the reference slice header for the texture slice corresponds to a slice header of the depth view component of the other view or a slice header of the texture view component of the other view; or
receiving, in the slice header extension of the depth slice, a syntax element indicating if the reference slice header for the depth slice corresponds to the slice header of the depth view component of the other view or the slice header of the texture view component of the other view.

41. The device of claim 38, wherein the video decoder further comprises:
means for receiving a slice ID of the depth slice or the texture slice of the indicated depth or texture view component, respectively.

42. The device of claim 38, wherein the video decoder further comprises:
means for receiving a slice ID for the depth slice and the texture slice, wherein the slice ID is received in at least one of the slice header or a network abstraction layer (NAL) unit header of a NAL unit of the view component.

43. The device of claim 38, wherein the video decoder further comprises:
means for receiving a slice ID for the depth slice and the texture slice, wherein the slice ID is received in an access unit including a network abstraction layer (NAL) unit of the depth view component and the texture view component, respectively.

44. The device of claim 35, wherein the device is a video encoder.

* * * * *